US010930178B2

(12) United States Patent
Cournoyer

(10) Patent No.: US 10,930,178 B2
(45) Date of Patent: Feb. 23, 2021

(54) LABEL, DEVICE, SYSTEM AND METHOD FOR SORTING BOLTS

(71) Applicant: SOLUTION 3D PLUS INC., Delson (CA)

(72) Inventor: Michel Cournoyer, Delson (CA)

( * ) Notice: Subject to any disclaimer, the term of this patent is extended or adjusted under 35 U.S.C. 154(b) by 0 days.

(21) Appl. No.: 16/704,458

(22) Filed: Dec. 5, 2019

(65) Prior Publication Data
US 2020/0111388 A1 Apr. 9, 2020

Related U.S. Application Data

(63) Continuation-in-part of application No. 16/129,344, filed on Sep. 12, 2018, now abandoned, which is a continuation-in-part of application No. 15/631,863, filed on Jun. 23, 2017, now abandoned.

(30) Foreign Application Priority Data

Jul. 5, 2016 (GB) .................................... 1611742

(51) Int. Cl.
G09F 3/02 (2006.01)
F16B 1/00 (2006.01)

(52) U.S. Cl.
CPC .............. *G09F 3/02* (2013.01); *F16B 1/0071* (2013.01); *G09F 2003/0216* (2013.01); *G09F 2003/0272* (2013.01)

(58) Field of Classification Search
CPC ............................................ G09F 2003/0276
USPC ......................................................... 40/913
See application file for complete search history.

(56) References Cited

U.S. PATENT DOCUMENTS

| 4,936,170 A * | 6/1990 | Zumeta | B25B 13/06 116/335 |
| 5,031,488 A * | 7/1991 | Zumeta | B25B 13/06 116/335 |
| 6,095,739 A * | 8/2000 | Albertson | F16B 1/0071 411/13 |
| 7,021,878 B1 * | 4/2006 | Albertson | B27F 7/00 403/27 |
| 8,739,444 B2 * | 6/2014 | Poole | G01B 3/34 283/81 |

* cited by examiner

*Primary Examiner* — Joanne Silbermann
(74) *Attorney, Agent, or Firm* — Benoit & Cote, Inc.; C. Marc Benoit

(57) ABSTRACT

A system for sorting hardware pieces having first and second characteristics. The system comprises: a chart displaying first values associated with the first characteristic, each first value associated to a unique first graphical combination comprising a first-characteristic background motif and a first-characteristic indicium overlaid thereon; and second values associated with the second characteristic, each second value associated to a unique second graphical combination comprising a second-characteristic background motif and a second-characteristic indicium overlaid thereon; an identification label indicative of the first and second characteristics and comprising: a first section covered with a first graphical composition comprising the first graphical combination; and a second section covered with a second graphical composition comprising the second graphical combination; and a container affixed with the identification label for containing the hardware piece corresponding to the first and second characteristics.

12 Claims, 24 Drawing Sheets

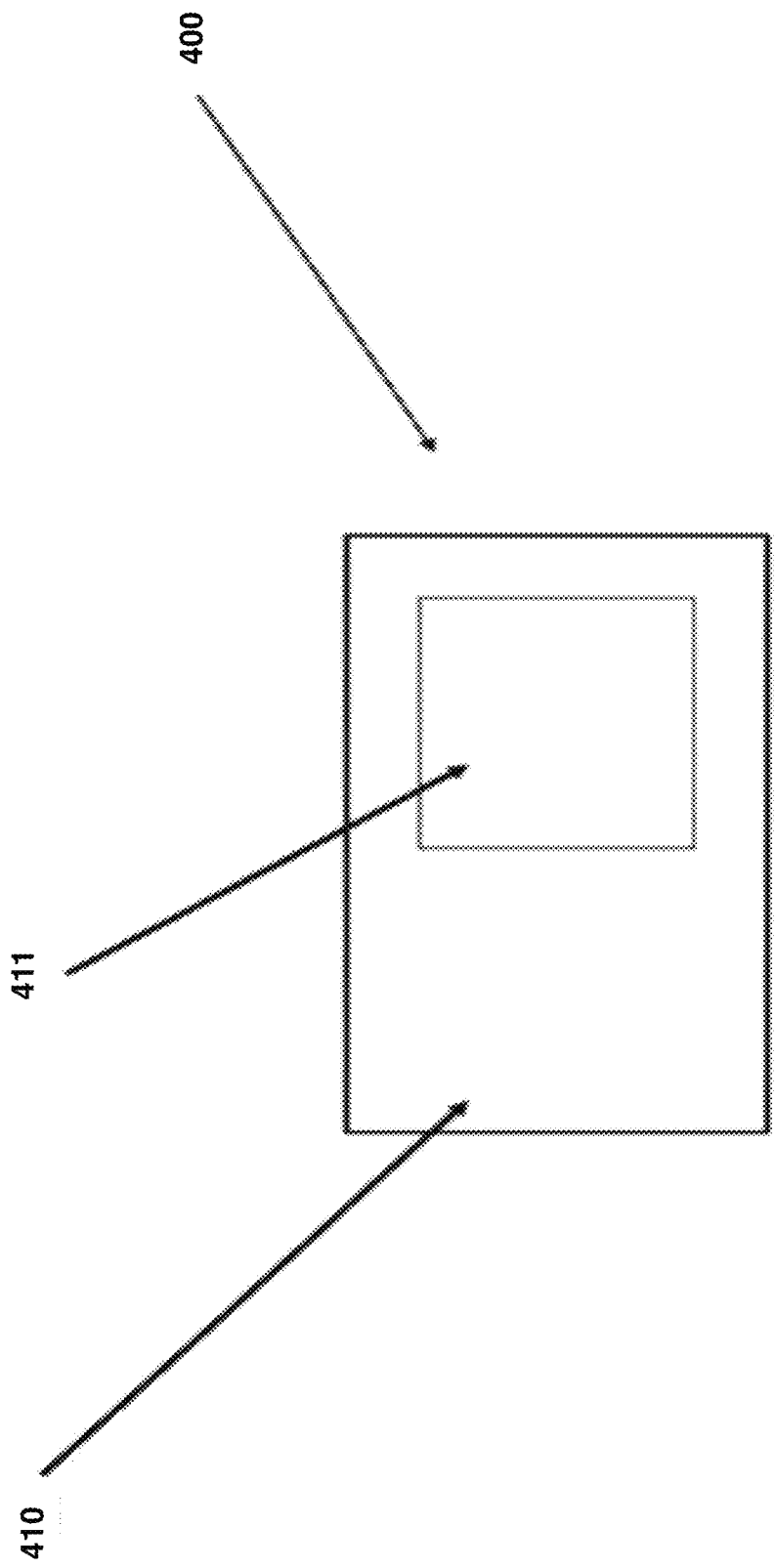

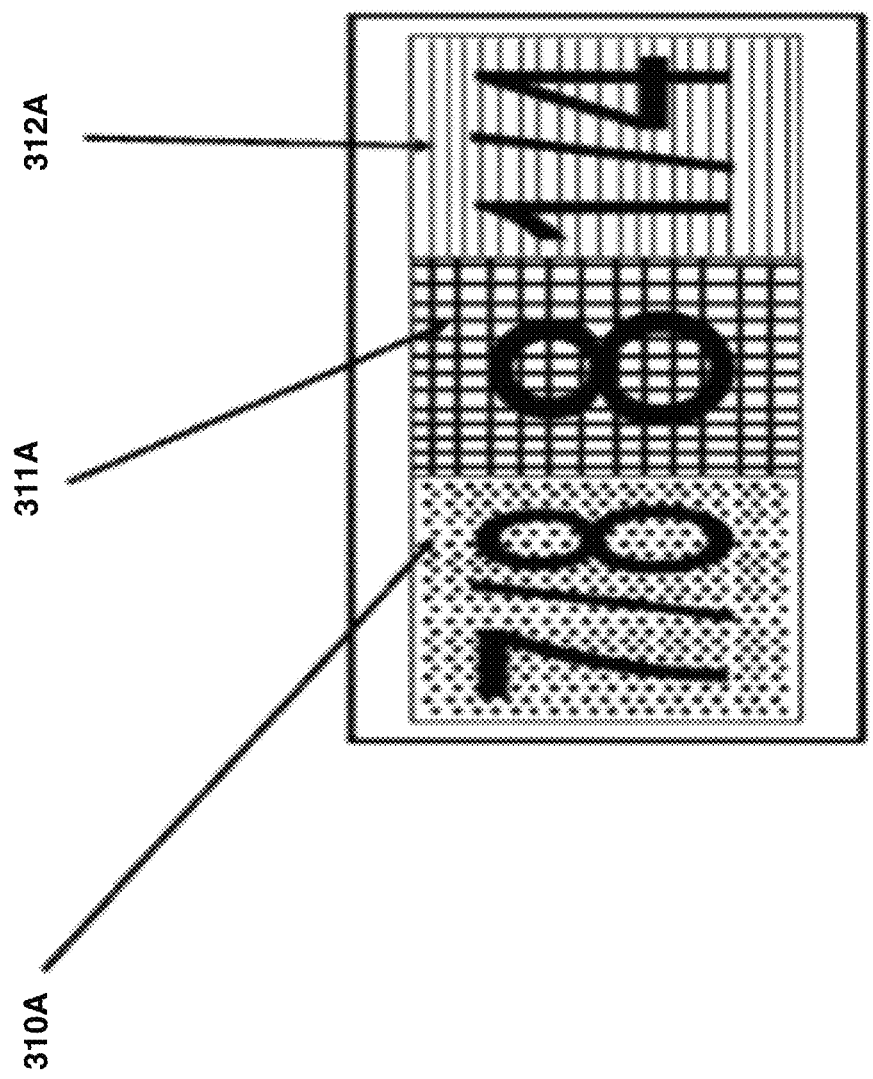

US 10,930,178 B2

LABEL, DEVICE, SYSTEM AND METHOD FOR SORTING BOLTS

CROSS-REFERENCE TO RELATED APPLICATION

The present patent application is a continuation-in-part of U.S. application Ser. No. 16/129,324 filed on Sep. 12, 2018, which is a continuation-in-part of U.S. patent application Ser. No. 15/631,863, filed on Jun. 23, 2017, which claims the benefits of priority of GB Patent Application No. 1611742.6, entitled "Color and shape code for sorting bolts", filed on Jul. 5, 2016, the specification of which is hereby incorporated herein by reference in its entirety.

BACKGROUND

(a) Field

The present invention generally relates to classification and identification systems. More particularly, the present invention relates to a label, device, system and method for sorting hardware pieces such as bolts, bars, pins, studs, dowels, screws or the like depending on their characteristic dimensions, such as length and diameter, in order to facilitate distant identification.

(b) Related Prior Art

Classification and identification of work tools is considered as one of the major factors influencing the operating time and costs on worksites. Usually, tool identification may require additional displacement, research and even measurement efforts from the operators to correctly choose the needed tools. Similarly, the identification of bolts, bars, pins, studs, dowels, screws or the like may, sometimes, be visually difficult or even impossible when being installed on worksites.

Conventionally, the size of each hand tool used to be stamped into the outer surface of the hand tool in order to help the user to properly identify and choose the needed tool. However, while performing in environment in which grease, oil and dust may easily soil the surface of the tool, the stamped size information may be easily obscured.

Nowadays, classification methods and systems, such as the color code tool identification method disclosed in the U.S. Pat. No. 4,841,653 and the identification system disclosed in the U.S. Pat. No. 6,082,227, have been proposed to sort and to classify tools, such as hand tools or cutting tools. These methods and systems provide, specifically, color bands to allow marking the work tools depending of their sizes. However, such systems are not essentially accommodated to be used at worksites with bolts which, once being in use or installed in devices, machines or structures, do not necessary keep their initial surface texture and become sometimes non-visible to the user.

Furthermore, some visual coding systems, such as the system disclosed in the U.S. Pat. No. 4,982,627, have provided a color chart to assist in the determination of the size of various hand tools. Such coding systems require the existence of at least one groove formed on the surface of the tool in order to receive the colored material and to form both together a color ring indicating a size numeral. Such systems are considered inconvenient as they require, minimally, machining the tool surface which not only presents additional costs but also may lead to tool's deterioration.

U.S. Pat. No. 8,739,444 (Poole) describes a "Color coding system for sizing fastener parts, tools and storage bins" to assist in identifying and matching the cooperating diameters of fasteners, parts and tools by using color code markings on the various sizes of tools and fastener parts. The coding system disclosed color codes markings which are disposed on the front surface of a storage bin. It does not describe or use a chart but rather a bolt gauge (col. 4, line 66) and it does not show the use of both a color and a number for each of the length and the diameter of the bolt.

According to Poole the storage comprises a plurality of compartments, or rooms, for holding fasteners parts according to their size (diameter). This system does not take in account the world of big components which can weigh many tons and does not provide for the identification of a structural bolt container from a distance. Poole does not cover the same range of possibilities according to the reality of the structural construction industries.

For example, in the structural construction industry, the bolt lengths go from 1½ inch to more than 20 inches in length. Such a range requires a better system to identify all the possibilities in one chart which is practical and understandable by everybody on the construction site.

Despite the previous use of different tool identification systems, there is still a need to provide a color code system allowing an easy distant identification of hardware pieces when being simply stored, shipped from the manufacturer to the user or installed on worksites.

SUMMARY OF THE INVENTION

The shortcomings of the prior art are generally mitigated by providing color and shape code label, device, system and method for sorting bolts, bars, pins, studs, dowels, screws or the like (collectively and individually described herein as a hardware piece).

According to an embodiment, there is provided a system for sorting hardware pieces, wherein each one of the hardware pieces has a first characteristic and a second characteristic, the system comprising: a chart on which are displayed: a plurality of unique first graphical combinations associated with the first characteristic of a hardware piece, wherein each unique first graphical combination comprises a first-characteristic indicium overlaid on a first-characteristic background motif; and a plurality of unique second graphical combinations associated with the second characteristic of a hardware piece, wherein each unique second graphical combination comprises a second-characteristic indicium overlaid on a second-characteristic background motif; an identification label indicative of the first and second characteristics associated with the hardware piece, the identification label comprising: a first section comprising at least one of the unique first graphical combinations associated with the first characteristic of the hardware piece; and a second section comprising at least one of the unique second graphical combinations associated with the second characteristic of the hardware piece; and a container affixed with the identification label for containing the hardware piece which correspond to the first and second characteristics.

According to an aspect, at least one of the first-characteristic indicium and the second-characteristic indicium comprises one of a numerical value and a symbol.

According to an aspect, at least one of the background motifs comprises at least one of at least one color and a graphical arrangement.

According to an aspect, in relation with all of the identification labels, the first-characteristic indicium and the second-characteristic indicium depicted on the identification label is depicted in a color absent from the background motif associated depicted on the identification label.

According to an aspect, the system further comprises a structure on a worksite with an identification label attached thereto, wherein the structure comprises components adapted to receive a hardware piece having the characteristics associated with the identification label.

According to an aspect, the chart displays a plurality of unique third graphical combinations associated with the second characteristic of a hardware piece, wherein each unique third graphical combination comprises a third-characteristic indicium overlaid on a third-characteristic background motif, further wherein the label comprises a third section comprising at least one of the unique third graphical combinations associated with one of the first or the second characteristics of the sorted hardware piece.

According to an aspect, the hardware pieces have a third characteristic associated therewith corresponding to a type among a plurality of types, wherein the chart further comprises a plurality of symbols with each one of the symbols associated with a corresponding one of types; and wherein the identification label further comprises a fourth section at least partially covered with the symbol associated with the hardware piece.

According to an aspect, at least one hardware piece is further characterized by an assembly requirement, wherein the chart further comprises an assembly-requirement symbol associated with the assembly requirement; and wherein the identification label further comprises a fifth section identified thereon comprising the assembly-requirement symbol when the assembly requirement is present in relation with the hardware piece having the first characteristic and the second characteristic.

According to an embodiment, there is provided a container for containing hardware pieces, wherein each one of the hardware pieces has a first and a second characteristics, the container comprising: a compartment to house the hardware pieces; and an identification label mounted about the compartment and comprising: a first section comprising at least one unique first graphical combinations associated with the first characteristic of the hardware pieces, comprising: a first background motif covering at least part of the first section; and a first indicium overlaid on the first background motif; a second section comprising at least one unique second graphical combinations associated with the second characteristic of the hardware pieces, comprising: a second background motif covering at least part of the second section; and a second indicium overlaid on the second background motif.

According to an aspect, at least one of the first-characteristic indicium and the second-characteristic indicium comprises one of a numerical value and a symbol.

According to an aspect, there are a plurality of unique third graphical combinations associated with the second characteristic of a hardware piece, wherein each unique third graphical combination comprises a third-characteristic indicium overlaid on a third-characteristic background motif, further wherein the label comprises a third section comprising at least one of the unique third graphical combinations associated with one of the first or the second characteristics of the hardware piece.

According to an aspect, the hardware pieces have a third characteristic associated therewith corresponding to a type among a plurality of types, wherein the identification label further comprising a fourth section at least partially covered with the symbol associated with the type of the hardware piece.

According to an aspect, at least one of the backgrounds comprises at least one of at least one color and a graphical arrangement.

According to an aspect, the first-characteristic indicium and the second-characteristic indicium on the identification label is depicted in a color absent from the background motif associated therewith on the identification label.

According to an aspect, the container further comprises a structure on a worksite with an identification label attached thereto, wherein the structure comprises components adapted to receive a hardware piece having the characteristics associated with the identification label.

According to an aspect, at least one hardware piece is further characterized by an assembly requirement, wherein the identification label further comprises a fifth section identified thereon comprising an assembly-requirement symbol when the assembly requirement is present in relation with the hardware piece having the first characteristic and the second characteristic.

According to an embodiment, there is provided a method for sorting hardware pieces, wherein each one of the hardware pieces has a first characteristic having a first value associated therewith and a second characteristic having a second value associated therewith, the method comprising: providing a chart on which are displayed the first value and the second value; providing a container system comprising a plurality of compartments to hold hardware pieces; providing a plurality of identification labels affixed to the container system, wherein each of the identification label is affixed about and associated with one of the compartments, each one of the identification label comprising a first section covering a first portion of the identification label and a second section covering a second portion of the identification label, with the first section being covered by a first graphical composition comprising a first background motif and a first indicium overlaid on the first background motif, with the first background motif and the first indicium being specific to the first value, and the second section being covered by a second graphical composition comprising a second background motif and a second indicium overlaid on the second background motif, with the second background motif and the second indicium being specific to the second; providing a hardware piece for sorting; identifying the values of the first and second characteristic of the hardware piece; identifying an identification label among the identification labels with the first graphical composition and the second graphical composition corresponding to the values associated with the characteristics of the hardware piece; and placing the hardware piece in the compartment with the identified identification label associated therewith.

According to an aspect, the method further comprises providing one of a numerical value and a symbol as one of the first-characteristic indicium and the second-characteristic indicium.

According to an aspect, the method further comprises providing at least one of at least one color and a graphical arrangement as one of the backgrounds.

According to an aspect, the method further comprises providing a structure on a worksite and attaching an identification label attached thereto, wherein the structure comprises components adapted to receive a hardware piece having the characteristics associated with the identification label.

According to an embodiment, there is provided a system for sorting hardware pieces among which are bolts, bars, pins, studs, dowels and screws, wherein each one of the hardware pieces has a first characteristic and a second characteristic thereof, the system comprising: a chart on which are displayed: a plurality of first values associated with the first characteristic of a hardware piece, with each first value having associated therewith a unique first graphical combination comprising a first-characteristic background motif and a first-characteristic indicium overlaying the first-characteristic background motif; and a plurality of second values associated with the second characteristic of a hardware piece, with each second value having associated therewith a unique second graphical combination comprising a second-characteristic background motif and an second-characteristic indicium overlaying the second-characteristic background motif; an identification label indicative of the two characteristics associated with the hardware piece, the identification label comprising: a first section at least partially covered with a first graphical composition comprising the first combination associated with the first characteristic of the hardware piece; and a second section at least partially covered with a second graphical composition comprising the second combination associated with the second characteristic of the sorted hardware piece; and a container affixed with the identification label for containing the hardware piece which correspond to first and second characteristics.

According to an embodiment, there is provided a container for containing hardware pieces among which are bolts, bars, pins, studs, dowels and screws, wherein the hardware pieces have a set of values associated with each one of two characteristics of the hardware pieces, the container comprising: a compartment to house the hardware pieces therein; and an identification label mounted about the compartment and comprising: a first section covering a first portion of the identification label, the first section comprising a first graphical composition specific to the value in the set of values associated with the first characteristic of the hardware pieces to be housed in the compartment, comprising: a first background motif covering at least part of the first section; and a first indicium overlaying the first background motif; a second section covering a second portion of the identification label, the second section comprising a second graphical composition specific to the value in the set of values associated with the second characteristic of the hardware pieces to be housed in the compartment, comprising: a second background motif covering at least part of the second section; and a second indicium overlaying the second background motif.

According to an embodiment, there is provided a method for sorting hardware pieces among which are bolts, bars, pins, studs, dowels and screws, wherein each one of the hardware pieces has a first characteristic having a first value associated therewith and a second characteristic having a second value associated therewith, the method comprising: providing a chart on which are displayed the first value and the second value; providing a container system comprising a plurality of compartments to hold hardware pieces; providing a plurality of identification labels affixed to the container system, wherein each of the identification label is affixed about and associated with one of the compartments, each one of the identification label comprising a first section covering a first portion of the identification label and a second section covering a second portion of the identification label, with the first section being covered by a first graphical composition comprising a first background motif and a first indicium overlaying the first background motif, with the first background motif and the first indicium being specific to a first value associated with the first characteristic of a to-be-sorted hardware piece, and the second section being covered by a second graphical composition comprising a second background motif and a second indicium overlaying the second background motif, with the second background motif and the second indicium being specific to a value associated with the second characteristic of the to-be-sorted hardware piece; providing a being-sorted hardware piece; identifying the values of the first and second characteristic of the being-sorted hardware piece; identifying an identification label among the identification labels with the first graphical composition and the second graphical composition corresponding to the values associated with the characteristics of the being-sorted hardware piece; and placing the being-sorted hardware piece in the compartment with the identified identification label associated therewith.

According to an embodiment, there is provided a system for sorting hardware pieces, wherein each one of the hardware pieces has a first characteristic, the system comprising: a chart on which are displayed a plurality of unique first graphical combinations associated with the first characteristic of a hardware piece, wherein each unique first graphical combination comprises a first-characteristic indicium overlaid on a first-characteristic background motif; and an identification label indicative of the first characteristic associated with the hardware piece, the identification label comprising a first section comprising at least one of the unique first graphical combinations associated with the first characteristic of the hardware piece.

According to an aspect, each one of the hardware pieces also has a second characteristic, wherein the chart further displays a plurality of unique second graphical combinations associated with the second characteristic of a hardware piece, wherein each unique second graphical combination comprises a second-characteristic indicium overlaid on a second-characteristic background motif, and wherein the identification label further comprises a second section comprising at least one of the unique second graphical combinations associated with the second characteristic of the hardware piece.

According to an aspect, at least one of the first-characteristic indicium and the second-characteristic indicium comprises one of a numerical value and a symbol.

According to an aspect, at least one of the background motifs comprises at least one of at least one color and a graphical arrangement.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 4 illustrates a preferred embodiment of an identification label used with the metric measurement system in accordance with the principles of the present invention.

FIGS. 5A-5D illustrate examples of identification labels used with the imperial measurement system in accordance with the principles of the present invention.

DETAILED DESCRIPTION

Figure 1:
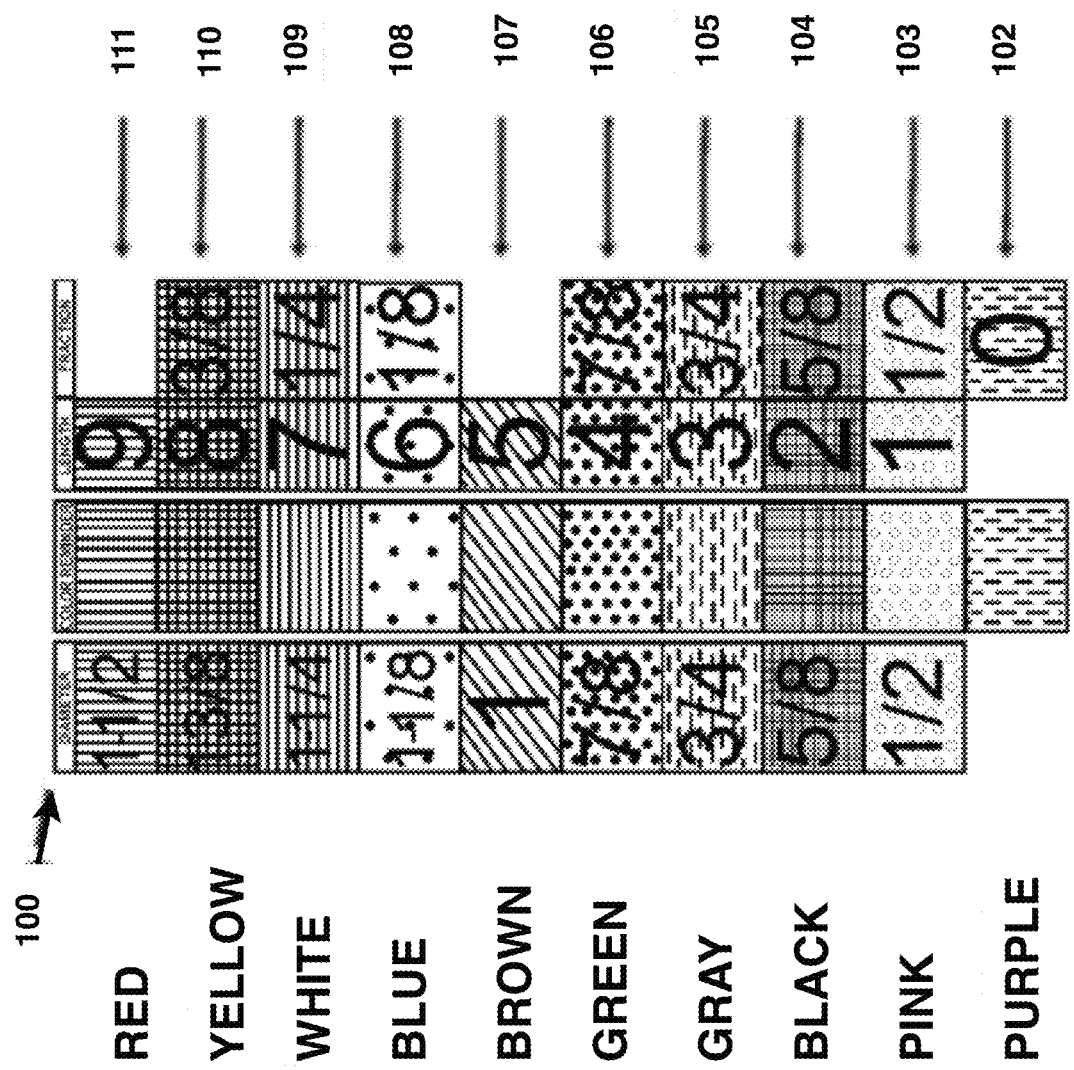
FIG. 1 illustrates a first embodiment of a color chart corresponding to all ten basic numerals and most commonly used fractions in the imperial measurement system in accordance with the principles of the present invention.

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as," or the like) provided herein, is intended merely to better illuminate the exemplary realizations and does not pose a limitation on the scope of the realizations. No language in the specification should be construed as indicating any unclaimed element as essential to the practice of the realizations.

In the following description, it is understood that terms such as "first", "second", "top", "bottom", "above", "below", and the like, are words of convenience and are not to be construed as limiting terms.

In realizations, there are disclosed a novel color and shape code label, device, system and method for sorting hardware pieces (e.g., bolts) which will be described hereinafter. Although the embodiments are described specific terms, it is to be understood that the embodiments described herein are by way of example only and that their scope is not intended to be limited thereby.

Further, throughout the following realizations, the terms letters, numbers and symbols are used for description. However, one should understand that these terms, or a combination thereof, may be designed as indicia (indicium in the singular form), which include a single one of them, or a combination or series of these indicative of a particular signification.

Similarly, the following realizations are described in terms of backgrounds and background components (e.g., color, motif, etc.). One should understand the ensemble of the color and motif, in contrast to the indicia, to be a background motif, comprising for instance a plain motif made of a single color or a combination of colors disposed according to a particular geometrical or spatial arrangement (e.g., a pattern) in order to define the background motif.

The expression "graphical combination" refers to an area covered by at least one graphical component and another component (graphical or not) that, combined together, define a perceivable graphical combination. According to a realization, the graphical components are assembled such as having one of the graphical components that is an overlay on (i.e., overlaid on) the other graphical component, such as the both the graphical component in the background and the overlaying graphical component are visible.

Referring to FIG. 1, a first embodiment of a color chart 100 corresponding to all ten basic numerals and most commonly used fractions in the imperial measurement system is illustrated. This color chart 100 allows, essentially, to classify and sort hardware pieces/parts based on their characteristic diameter and length. Hardware pieces comprise, among others, bolts, bars, pins, studs, dowels and screws. In fact, hardware pieces are meant to include any parts or pieces that need to be sorted according to one or more characteristics.

Going from bottom to top of the color chart 100, any color sequence may be used. For example, the purple color 102, may be symbolizing a temperature of zero kelvin or any other easy to remember element or concept, corresponds to the numeral zero. The pink color 103, symbolizing a pink candy or any other easy to remember element or concept, may correspond to the numeral one when identifying a length and to the fraction ½ when identifying either a diameter or a fractional length as commonly used in the imperial measurement system. The black color 104, symbolizing asphalt or any other easy to remember element or concept, may correspond to numeral two when identifying a length and to the fraction ⅝ when identifying either a diameter or a fractional length as commonly used in the imperial measurement system. The gray color 105, symbolizing a pavement or any other easy to remember element or concept, may correspond to the numeral three when identifying a length and to the fraction ¾ when identifying either a diameter or a fractional length as commonly used in the imperial measurement system. The green color 106, symbolizing the earth surface or any other easy to remember element or concept, may correspond to the numeral four when identifying a length and to the fraction ⅞ when identifying either a diameter or a fractional length as commonly used in the imperial measurement system. The brown color 107, symbolizing a tree trunk or any other easy to remember element or concept, may correspond to the numeral five when identifying a length and to the numeral one when identifying a diameter as commonly used in the imperial measurement system. The blue color 108, symbolizing the sky or any other easy to remember element or concept, may correspond to the numeral six when identifying a length, to the fraction ⅛ when identifying a fractional length, and to the fractional numeral 1⅛ when identifying a diameter as commonly used in the imperial measurement system. The white color 109, symbolizing the clouds or any other easy to remember element or concept, may correspond to the numeral seven when identifying a length, to the fraction ¼ when identifying a fractional length, and the fractional numeral 1¼ when identifying a diameter as commonly used in the imperial measurement system. The yellow color 110, symbolizing the sun or any other easy to remember element or concept, may correspond to the numeral eight when identifying a length, to the fraction ⅜ when identifying a fractional length, and to the fractional numeral 1⅜ when identifying a diameter as commonly used in the imperial measurement system. The red color 111, symbolizing high temperatures such as 100 degrees Celsius or any other easy to remember element or concept, may correspond to the numeral nine when identifying a length and to the fractional numeral 1½ when identifying a diameter as commonly used in the imperial measurement system.

Still referring to FIG. 1, four (4) columns are shown. The columns are identified from left to right as follows: diameter, color reminder, length, and fraction. The diameter and length are examples of a first characteristic and a second characteristic of the hardware pieces respectively. In FIG. 1, there are shown a plurality of unique first graphical combinations (e.g., each box in the first column) associated with the first characteristic of a hardware piece, wherein each unique first graphical combination comprises a first-characteristic indicium (i.e., a numerical value) overlaid on a first-characteristic background motif (i.e., a color, pattern or graphical arrangement). FIG. 1 also shows a plurality of unique second graphical combinations (e.g., each box in the third column) associated with the second characteristic of a hardware piece, wherein each unique second graphical combination comprises a second-characteristic indicium (i.e., a numerical value) overlaid on a second-characteristic background motif (i.e., a color, pattern or graphical arrangement).

Understandably, the color chart 100 is equally adapted to be used for both metric and imperial measurement systems.

Understandably, the color chart 100 would typically be attached to the containers in the store of a manufacturer, a shipper or a user. The color chart 100 would typically further be indicated in at least one commonly accessible place in each worksite.

Understandably, the main goal of establishing a correlation between colors, numerals and concrete symbols is to facilitate the memorization of the size signification of each color.

Figure 2:
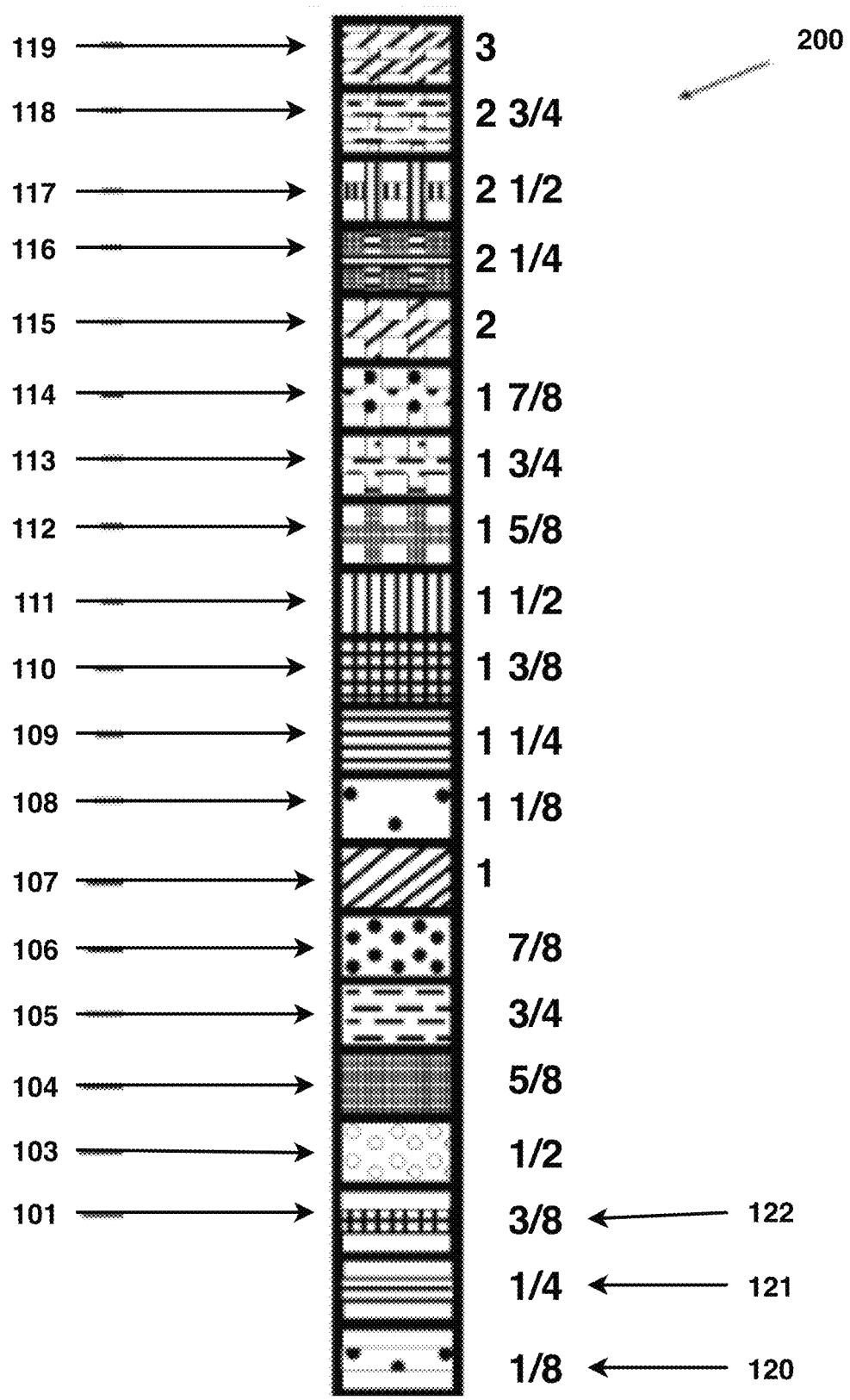
FIG. 2 illustrates a second embodiment of a color chart corresponding to most commonly used diameters in the imperial measurement system in accordance with the principles of the present invention.

Referring now to FIG. 2, a second embodiment of a color chart 200 corresponding to most commonly used diameters in the imperial measurement system is illustrated. Additionally, to all previous colors and diameters correspondence shown in FIG. 1, FIG. 2 provides the color presentation for less commonly used diameters in the imperial measurement system. The white box comprising a central yellow band 101 corresponds to the fractional numeral ⅜ when identifying a diameter as commonly used in the imperial measurement system. The white box comprising two vertical black lines crossing a horizontal black line 112 corresponds to the fractional numeral 1⅝ when identifying a diameter as commonly used in the imperial measurement system. The white box comprising two vertical gray lines crossing a horizontal gray line 113 corresponds to the fractional numeral 1¾ when identifying a diameter as commonly used in the imperial measurement system. The white box comprising two vertical green lines crossing a horizontal green line 114 corresponds to the fractional numeral 1⅞ when identifying a diameter as commonly used in the imperial measurement system. The white box comprising two vertical brown lines crossing a horizontal brown line 115 corresponds to the numeral 2 when identifying a diameter as commonly used in the imperial measurement system. The black box comprising two vertical white lines crossing a horizontal white line 116 corresponds to the fractional numeral 2¼ when identifying a diameter as commonly used in the imperial measurement system. The white box comprising two vertical red lines crossing a horizontal red line 117 corresponds to the fractional numeral 2½ when identifying a diameter as commonly used in the imperial measurement system. The white box comprising two vertical gray lines crossing two horizontal gray lines 118 corresponds to the fractional numeral 2¾ when identifying a diameter as commonly used in the imperial measurement system. The white box comprising two vertical brown lines crossing two horizontal brown lines 119 corresponds to the numeral 3 when identifying a diameter as commonly used in the imperial measurement system.

The white box comprising a central horizontal blue band 120 corresponds to the fractional numeral ⅛ when identifying a diameter or a fractional length as commonly used in the imperial measurement system. The black box comprising a central horizontal white band 121 corresponds to the fractional numeral ¼ when identifying a diameter or a fractional length as commonly used in the imperial measurement system. The white box comprising a central horizontal yellow band 122 corresponds to the fractional numeral ⅜ when identifying a diameter or a fractional length as commonly used in the imperial measurement system.

Understandably, the color chart 200 could be attached, next to the color chart 100, to the hardware piece containers in the store of a manufacturer, a shipper or a user. The color chart 200 would typically further be indicated in at least one commonly accessible place in each worksite.

Figure 3:
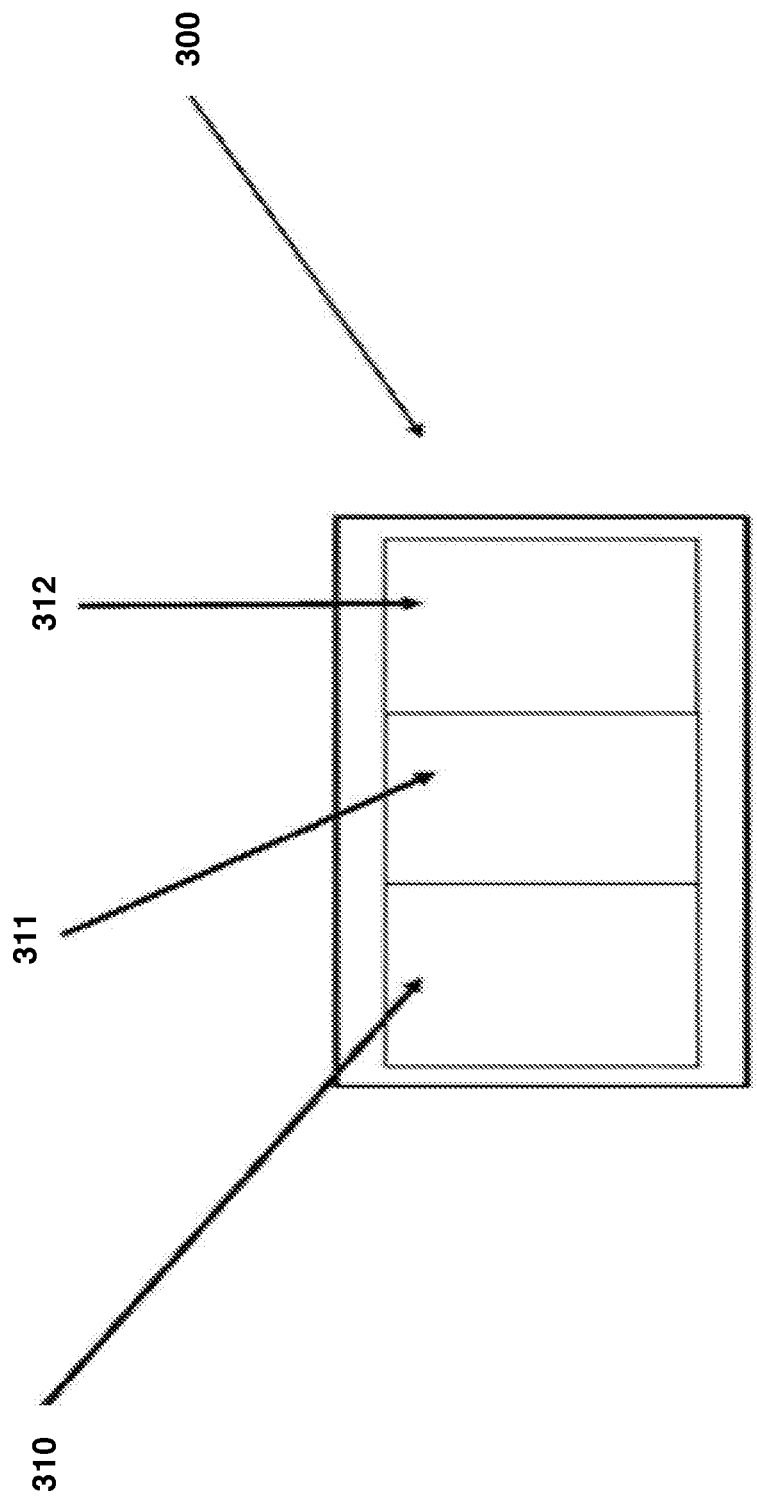
FIG. 3 illustrates a preferred embodiment of an identification label used with the imperial measurement system in accordance with the principles of the present invention.

Referring now to FIGS. 3 and 4, some preferred embodiments of an identification label 300 and 400 used, respectively, with the imperial and the metric measurement systems are illustrated. Each identification label 300 or 400 is adapted to be attached to the corresponding hardware piece container in the store of a manufacturer, a shipper or a user in order to properly classify and store hardware pieces. Each label 300 or 400 is further adapted to be attached on each support structure of each worksite comprising the corresponding hardware pieces. Such labels 300 or 400 allows a manufacturer to easily sort and identify the hardware pieces once being fabricated, allows the shipper to easily classify the hardware pieces during the delivery process and especially allows operators to easily identify and choose the needed hardware pieces to be installed and to easily find out which hardware piece is to be installed where in each structure of a worksite.

In a preferred embodiment, each label 300 or 400 comprises a first section 310 or 410 adapted to receive at least one background color or a numeral and preferably both. Each label 300 or 400 also comprise at least a second section 311 or 411 adapted to receive at least one color or a numeral and preferably both. For the imperial identification, label 300 or 400 may further comprise a third section 312 adapted to receive at least one color or a numeral and preferably both.

According to an embodiment, the first section 310 or 410 comprises at least one of the unique first graphical combinations associated with the first characteristic of the hardware piece. Furthermore, second section 311 or 411 comprises at least one of the unique second graphical combinations associated with the second characteristic of the sorted hardware piece. Moreover, when the label comprises a third section 312, it comprises at least one of the unique third graphical combinations associated with one of the first or the second characteristics of the sorted hardware piece. According to other interpretations, each section 310, 311, 312, 410, or 411 can be understood to comprise other sections or more than one unique graphical combinations. As such, it could be understood that, for example, there is only one section which comprises all graphical combinations or that one of the sections comprises more than one of the graphical combinations associated to a particular characteristic of the hardware piece.

For both imperial and metric measurements' systems, the background color or numeral of the first section 310 or 410 indicates the basic hardware piece diameter.

For the metric measurement system, the at least one color or the numeral of the at least one second section 411 indicates the characteristic length of the hardware piece in millimeters. (See FIG. 4)

For the imperial measurement system, the at least one color or the numeral of the at least one second section 311 indicates the integer part of the characteristic length of the hardware piece in inch. (See FIG. 3)

For the imperial measurement system, the at least one color or the numeral of the at least one third section 312 indicates the decimal part of the characteristic length of the hardware piece in inch. (See FIG. 3)

The color and shape identification allow either an easy distant identification or an easy location identification.

Understandably, in another embodiment each section of each label 300 or 400 may comprise just a number or a color.

Understandably, each of the first sections 310 or 410, the at least one second section 311 or 411 and the at least one third section 312, may comprise a combination of different colors. According to a convention, the colors should be read from left to right.

Understandably, the principle unit of all numerals figuring on the identification label 300 is the inch.

Understandably, the basic unit of all numerals figuring on the metric identification label 400 is the millimeter.

Figure 5A:
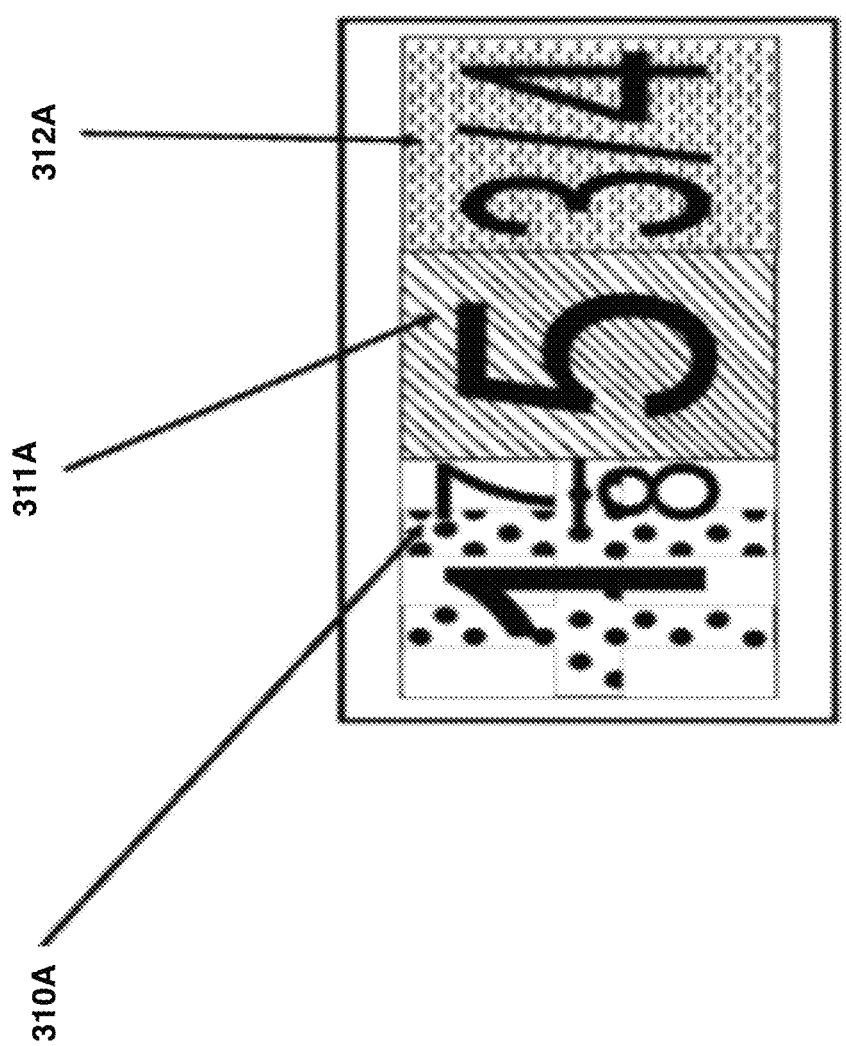

Referring to FIGS. 5A-5D, some examples of identification labels used with the imperial measurement system are illustrated. As shown on FIG. 5A, the first section 310A comprises a white background comprising two vertical green lines crossing one horizontal green line indicating, thus, a diameter of 1⅞" (See FIG. 2). The label comprises a second section 311A and a third section 312A identifying both together a decimal numeral indicating the characteristic length of the hardware piece in inches. The second section 311A being characterized by a brown color identifying an integer part 5 (See FIG. 1) and the third section 312A being characterized by a gray color identifying a decimal part ¾ (See FIGS. 1 and 2). Thus the identification label of FIG. 5A is directed to identify a hardware piece of a diameter of 1⅞" and a length of 5¾".

Figure 5C:
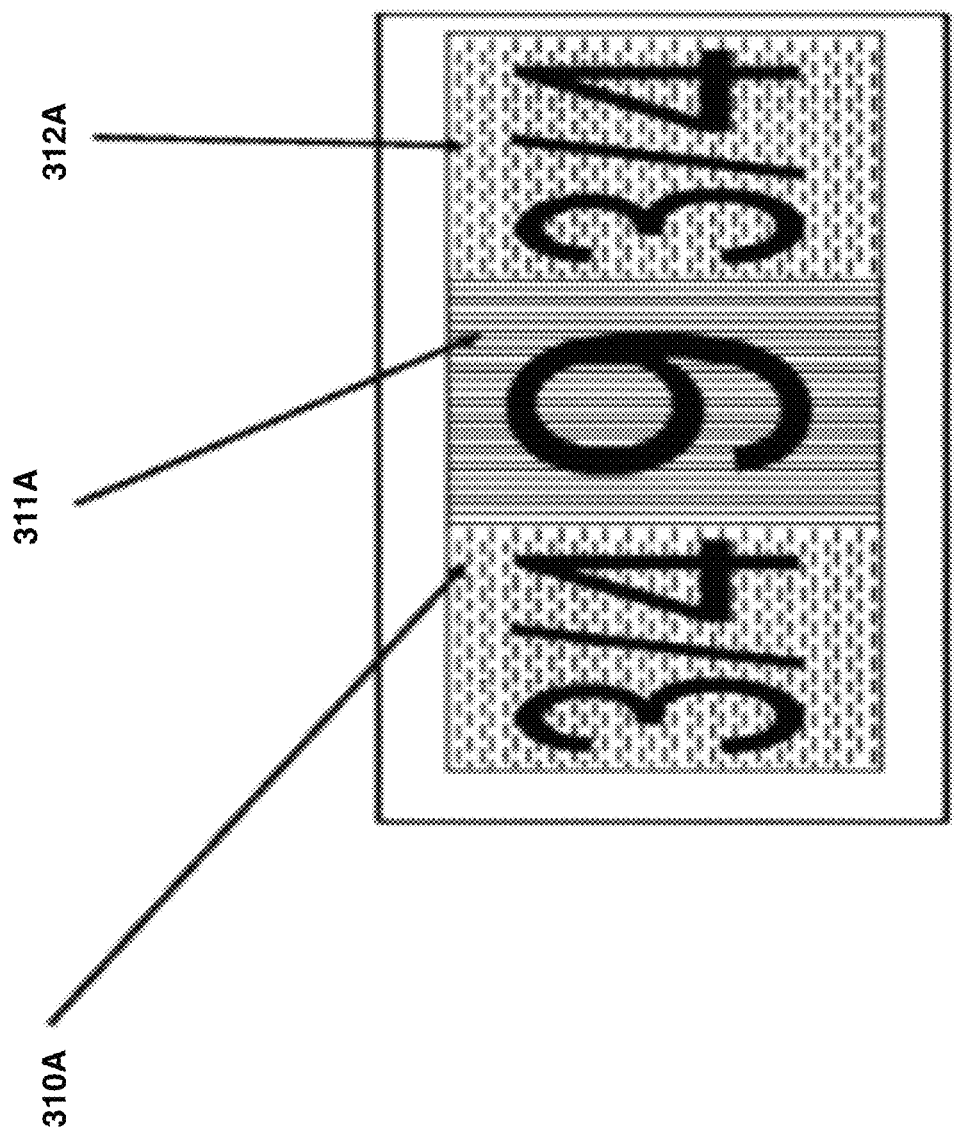
Figure 5D:
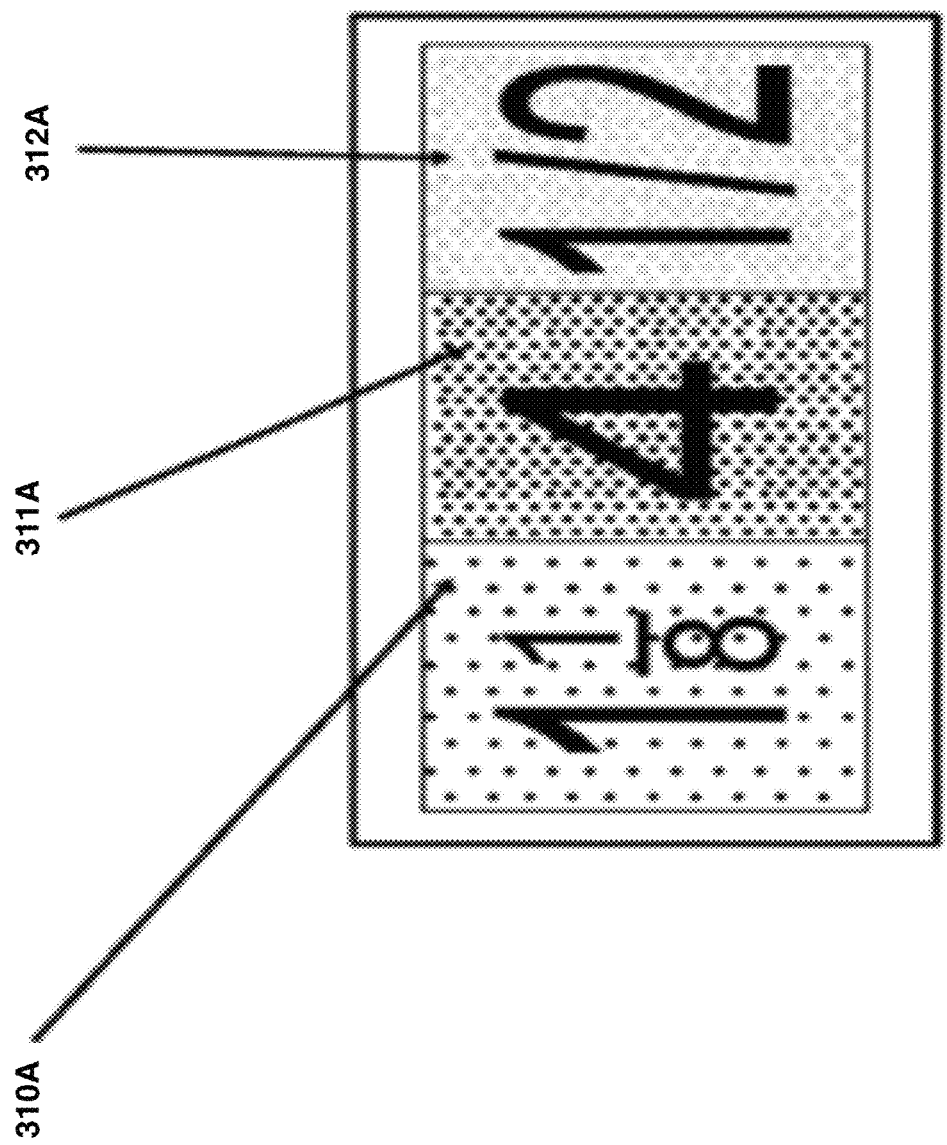

According to the same principles, FIGS. 5B-5D are directed to identify, respectively, a hardware piece of a diameter of ⅞" and a length of 8¼", a hardware piece of a diameter of ¾" and a length of 9¾" and a hardware piece of a diameter of 1⅛" and a length of 4½".

Figure 6A:
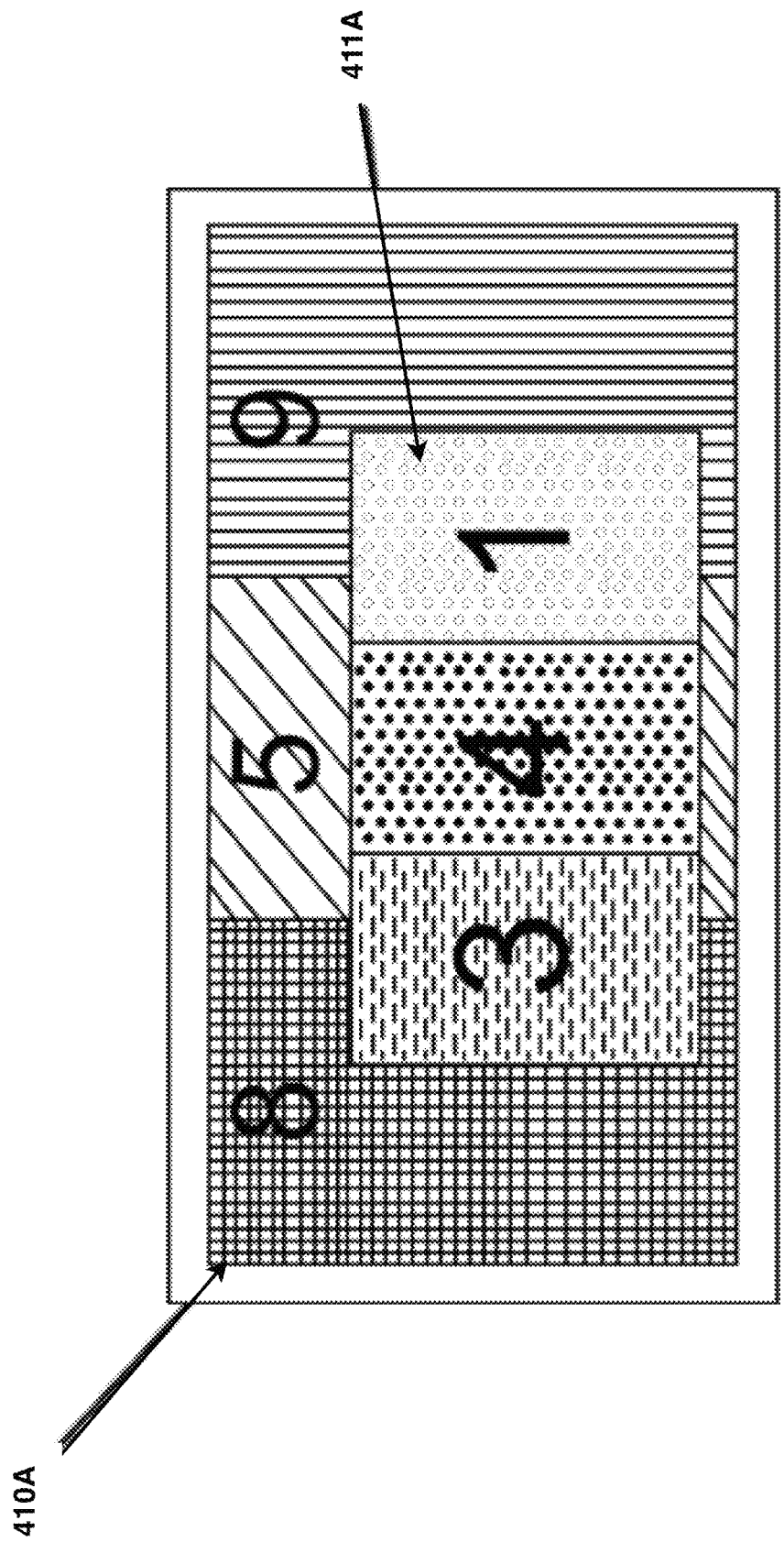
FIG. 6A-6D illustrate examples of identification labels used with the metric measurement system in accordance with the principles of the present invention.

Referring now to FIGS. 6A-6D, some examples of identification labels used with the metric measurement system are illustrated. As shown on FIG. 6A, the first section 410A comprises a multicolor background comprising first: the yellow color, second: the brown color and third: the red color indicating, thus, a diameter of 859 millimeters (See FIG. 6A). The label comprises a second section 411A being multicolored and comprising first: the gray color, second: the green color and third: the pink color indicating, thus a length of 341 millimeters. Thus, the identification label of FIG. 6A is directed to identify a hardware piece of a diameter of 859 millimeters and a length of 341 millimeters.

Figure 6B:
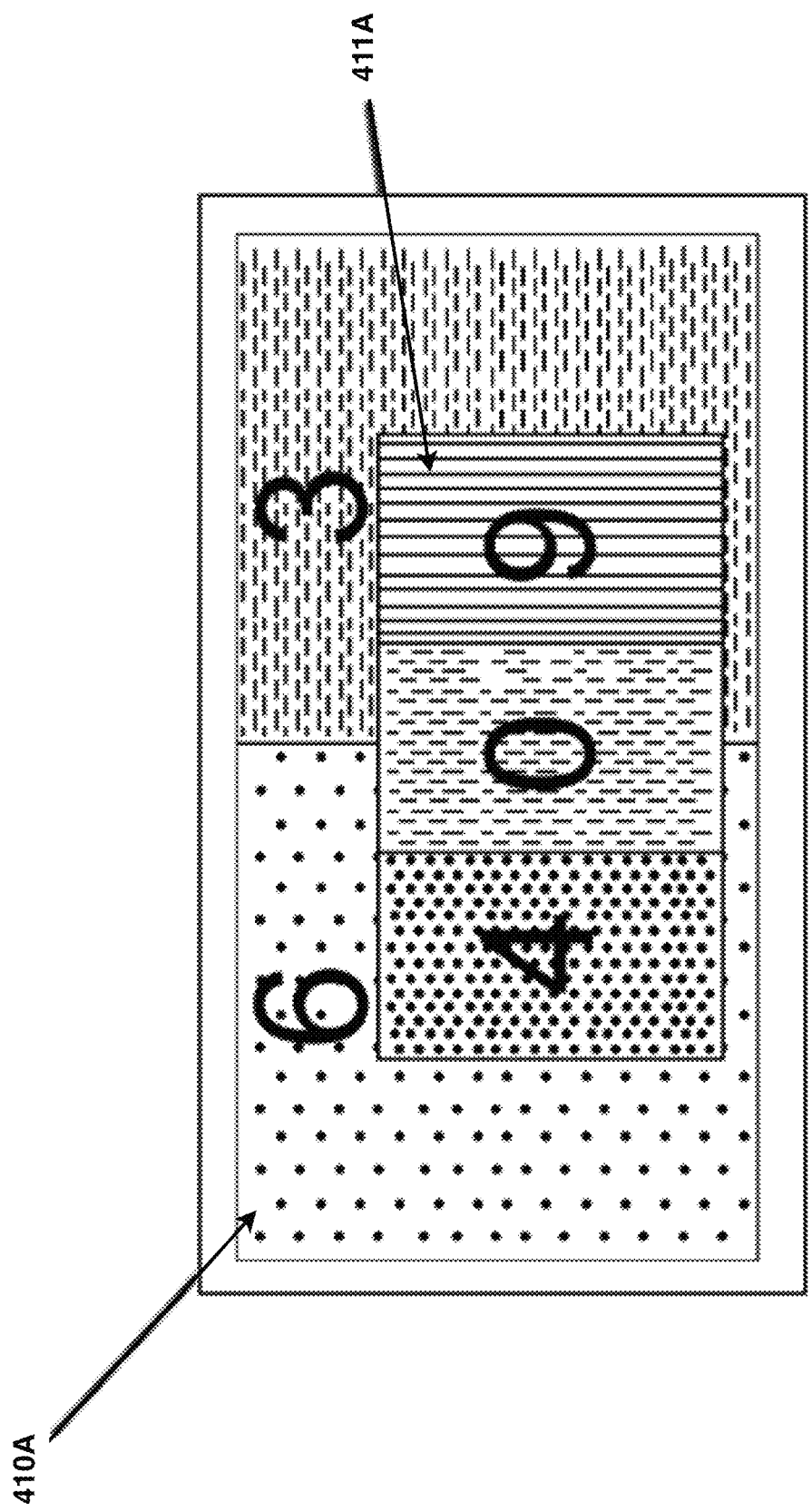
Figure 6C:
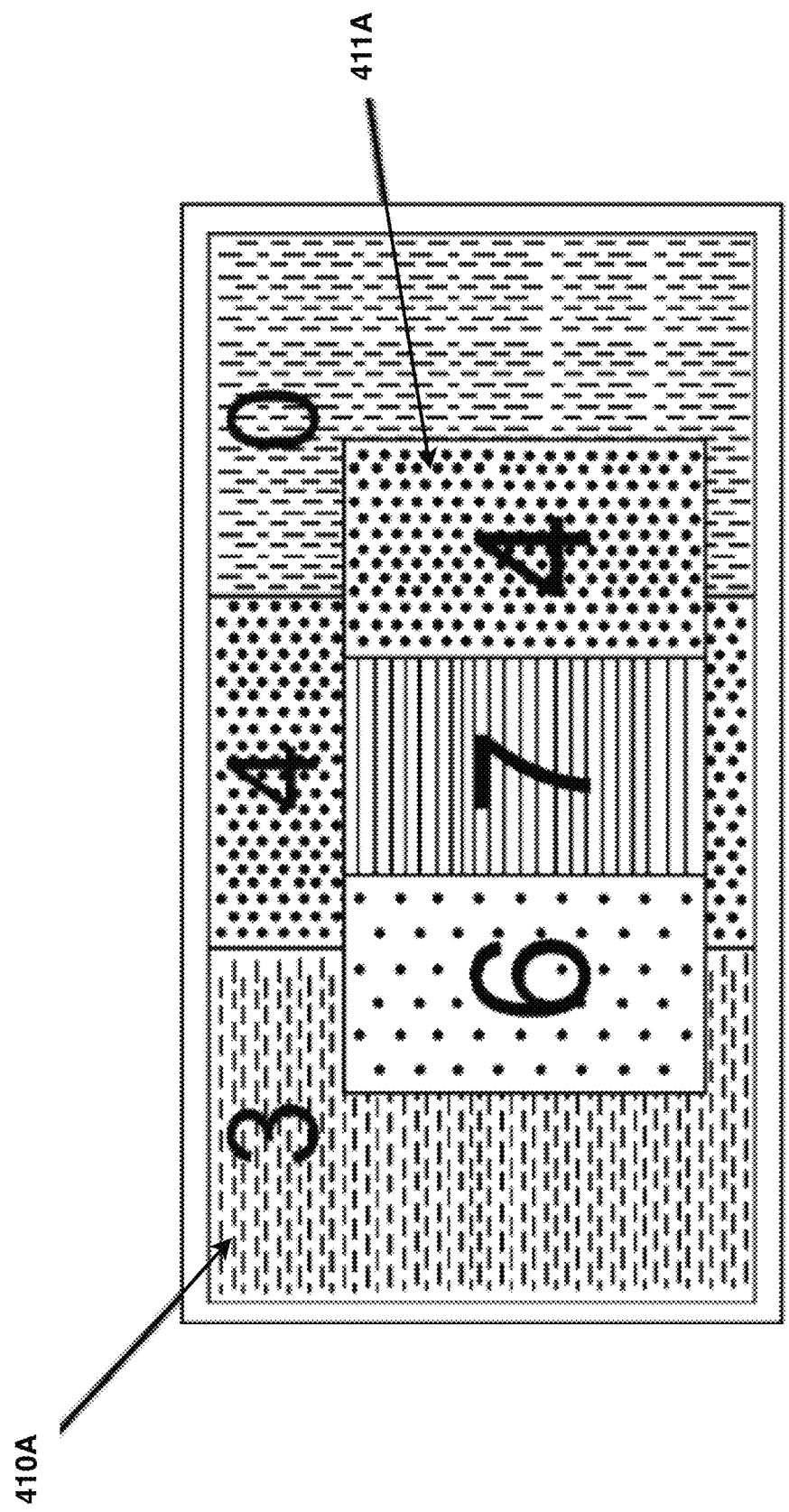
Figure 6D:
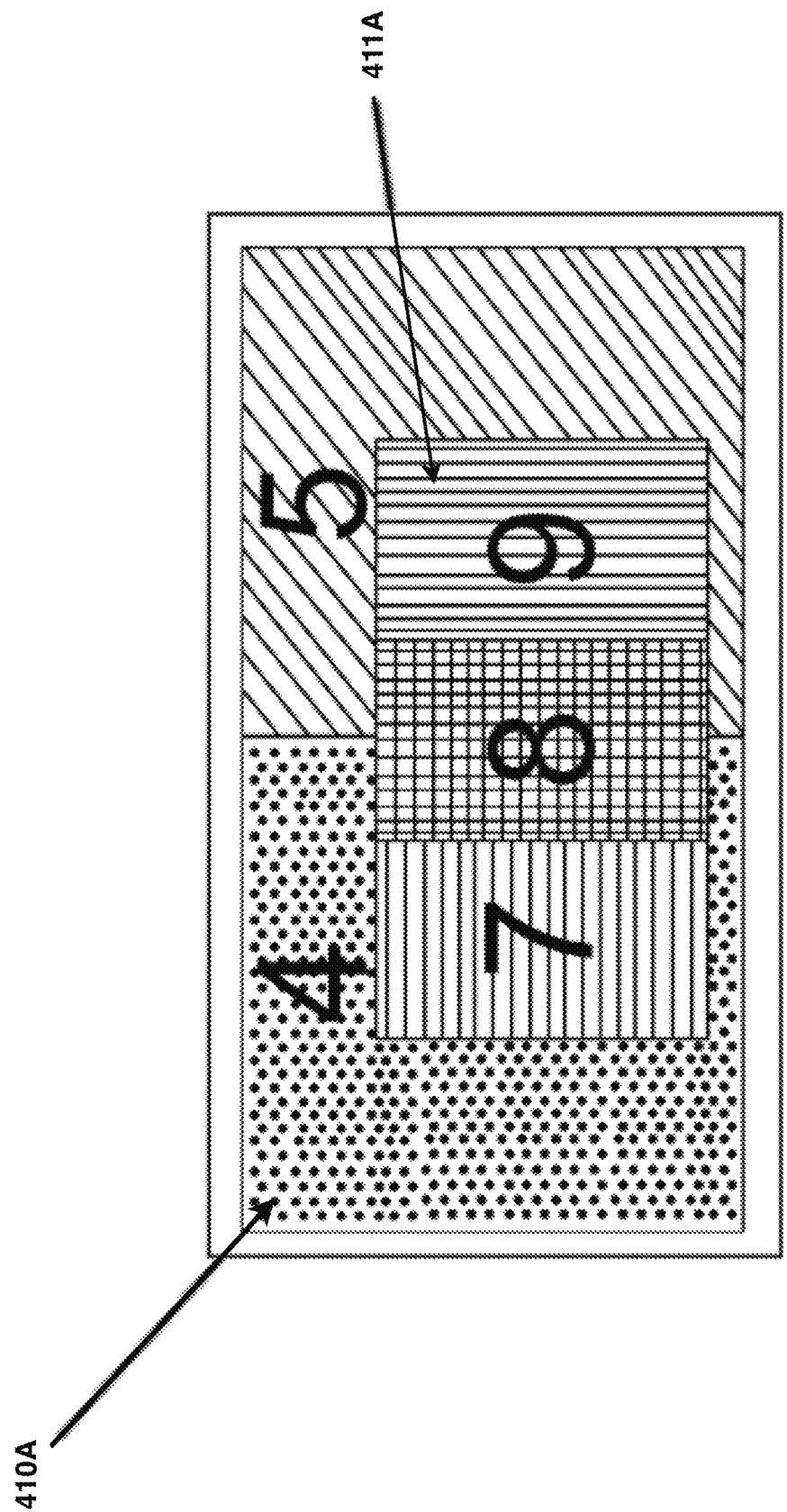

According to the same principles, FIGS. 6B-6D are directed to identify, respectively, a hardware piece of a diameter of 63 millimeters and a length of 409 millimeters, a hardware piece of a diameter of 340 millimeters and a length of 674 millimeters and a hardware piece of a diameter of 45 millimeters and a length of 789 millimeters.

Figure 7:
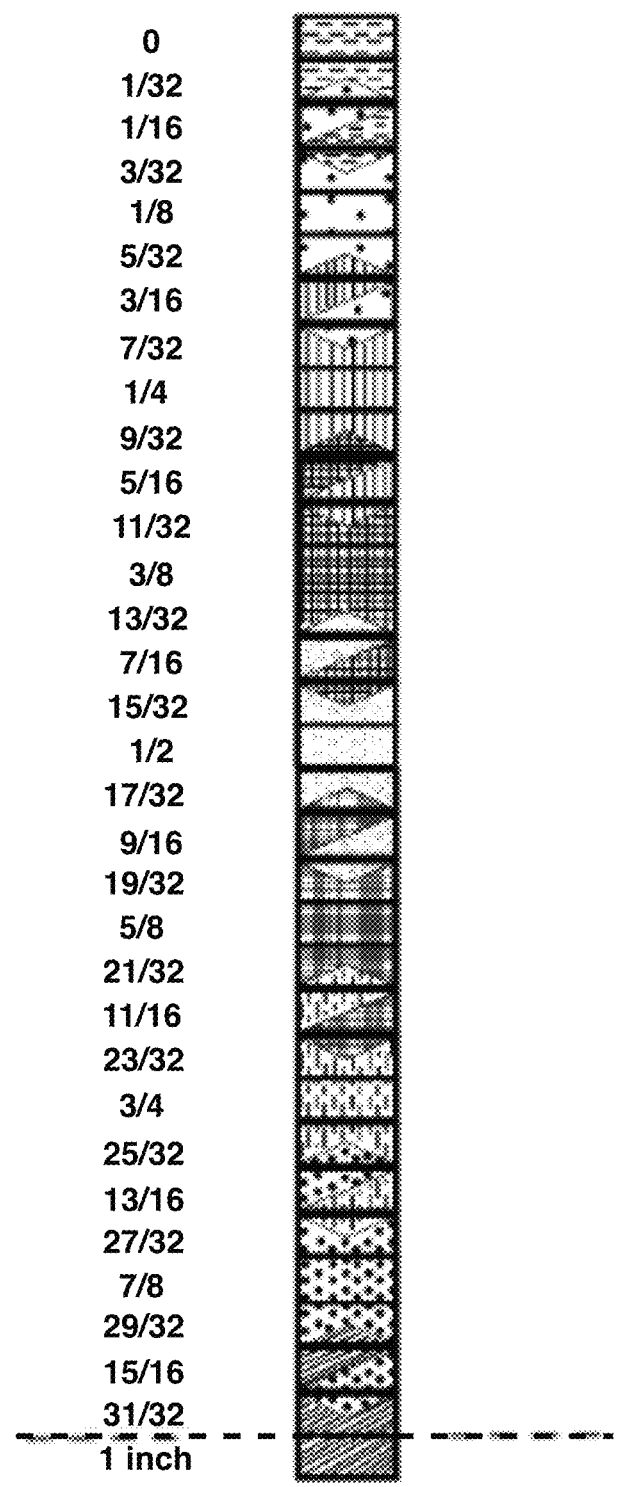
FIG. 7 illustrates a third embodiment of a color chart corresponding to rarely used fractions in the imperial measurement system in accordance with the principles of the present invention.

Referring now to FIG. 7, a color chart corresponding to rarely used fractions in the imperial measurement system is illustrated.

Referring now to FIGS. 1 to 7, a method for classifying and sorting hardware pieces is illustrated. The method comprises first identifying the characteristic dimensions of the hardware pieces, such as diameter and length of hardware pieces to be marked, then providing an identification label comprising at least one first section and at least one other section in the case of the imperial measurement system or more in the case of the metric measurement system. The method further comprises providing the first section with at least one background color or one numeral and preferably both and providing the at least one other section with at least one color or one numeral and preferably both.

In the case of the imperial measurement system, the method may further comprise providing an initial identification label comprising at least one first section, which comprises at least one first other section and at least one second other section. The method may further comprise providing the first section with at least one background color or one numeral and preferably both, providing the at least first other section with at least one color or one integer part of a numeral and preferably both and providing the at least second other section with at least one color or one fractional part representing the decimal part of the numeral and preferably both.

The method may further comprise reading the background colors from left to right to verify the diameter of the identified hardware piece and reading the colors of the at least one first other section taken alone or in combination with the at least one second other section to identify the length of the hardware piece depending on the measurement system used, either imperial or metric.

The method preferably further comprises attaching the identification labels on the containers of their corresponding hardware pieces and on their corresponding structures associated with the corresponding hardware pieces on each worksite. Marking the structures with identification labels on the worksite and the manufacturing plant allows the operators to more easily remotely identify the needed hardware pieces for these structures.

Understandably, the identification labels 300 or 400 may have any geometrical form once providing the needed identification sections. Preferably, the identification labels 300 or 400 may have a rectangular form.

Figure 8:
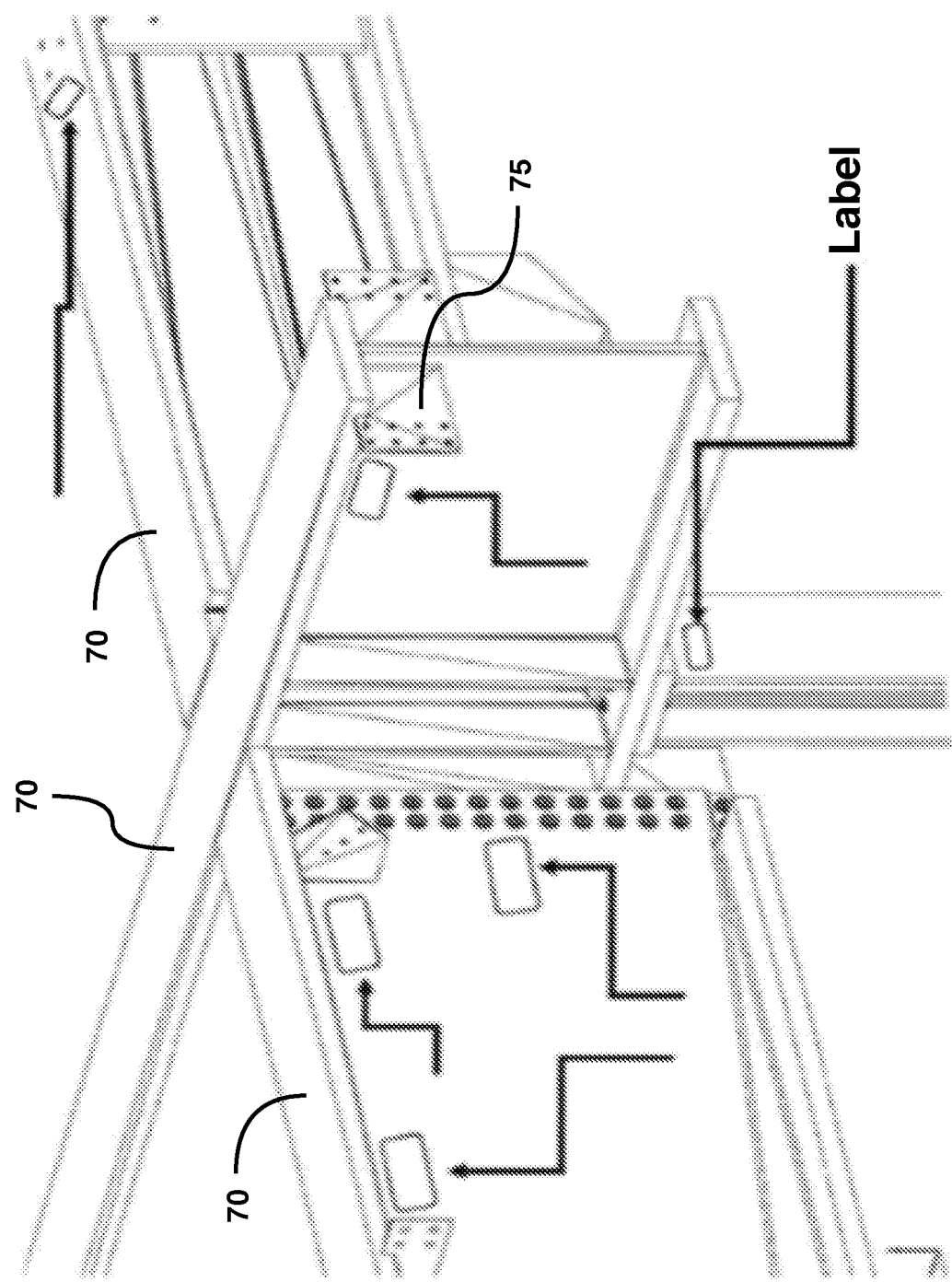
FIG. 8 illustrate an example of support structures wherein the identification labels are used to show the bolt type to use in the appropriate zones.

Referring to FIG. 8, an example of a structure on which are attached identification labels to show the type of hardware pieces to be installed in an appropriate zone allowing a distance identification of the hardware pieces.

Figure 9:
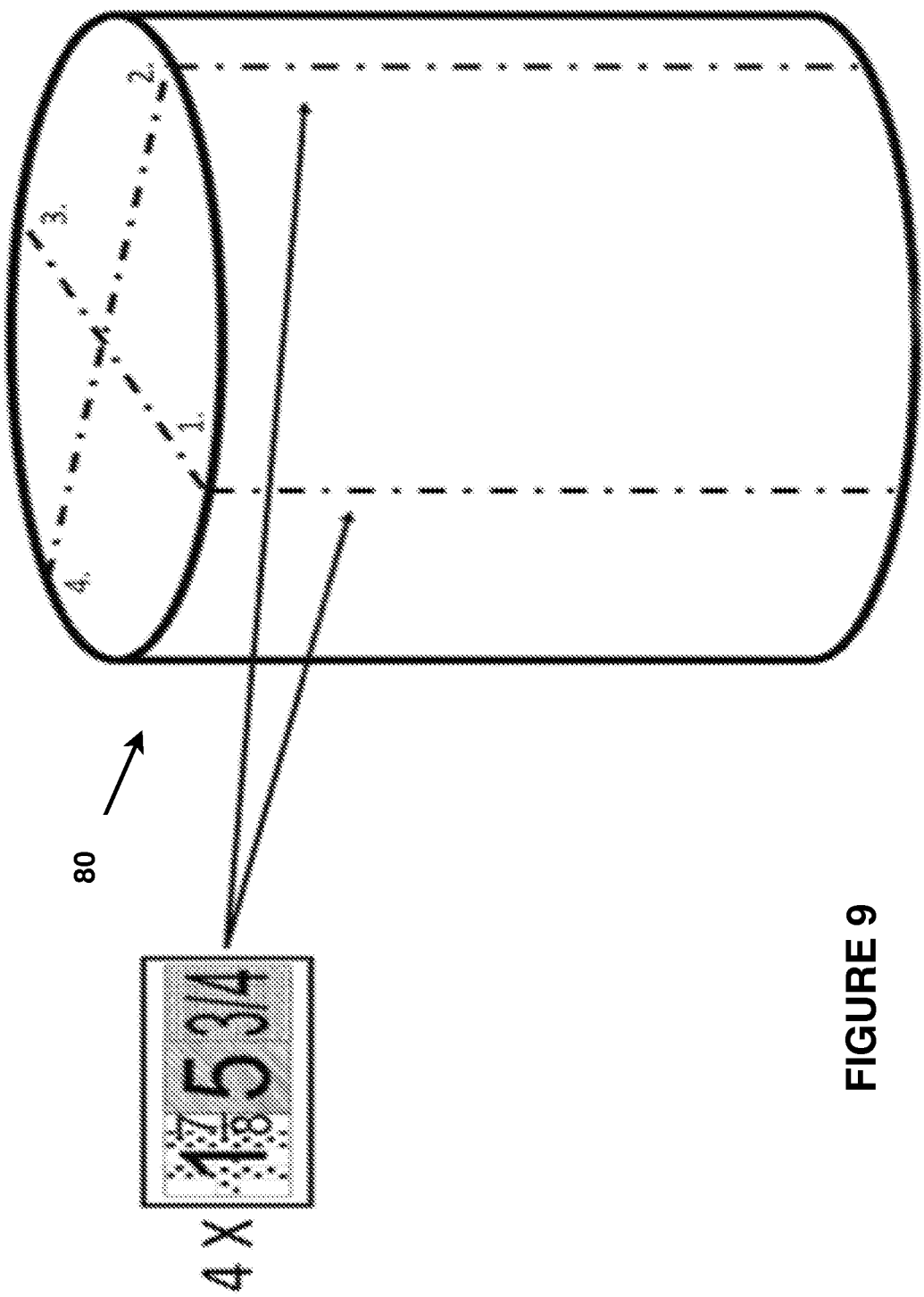
FIG. 9 illustrate a circular container wherein 4 identification labels are used on the body of the circular container.
Figure 10:
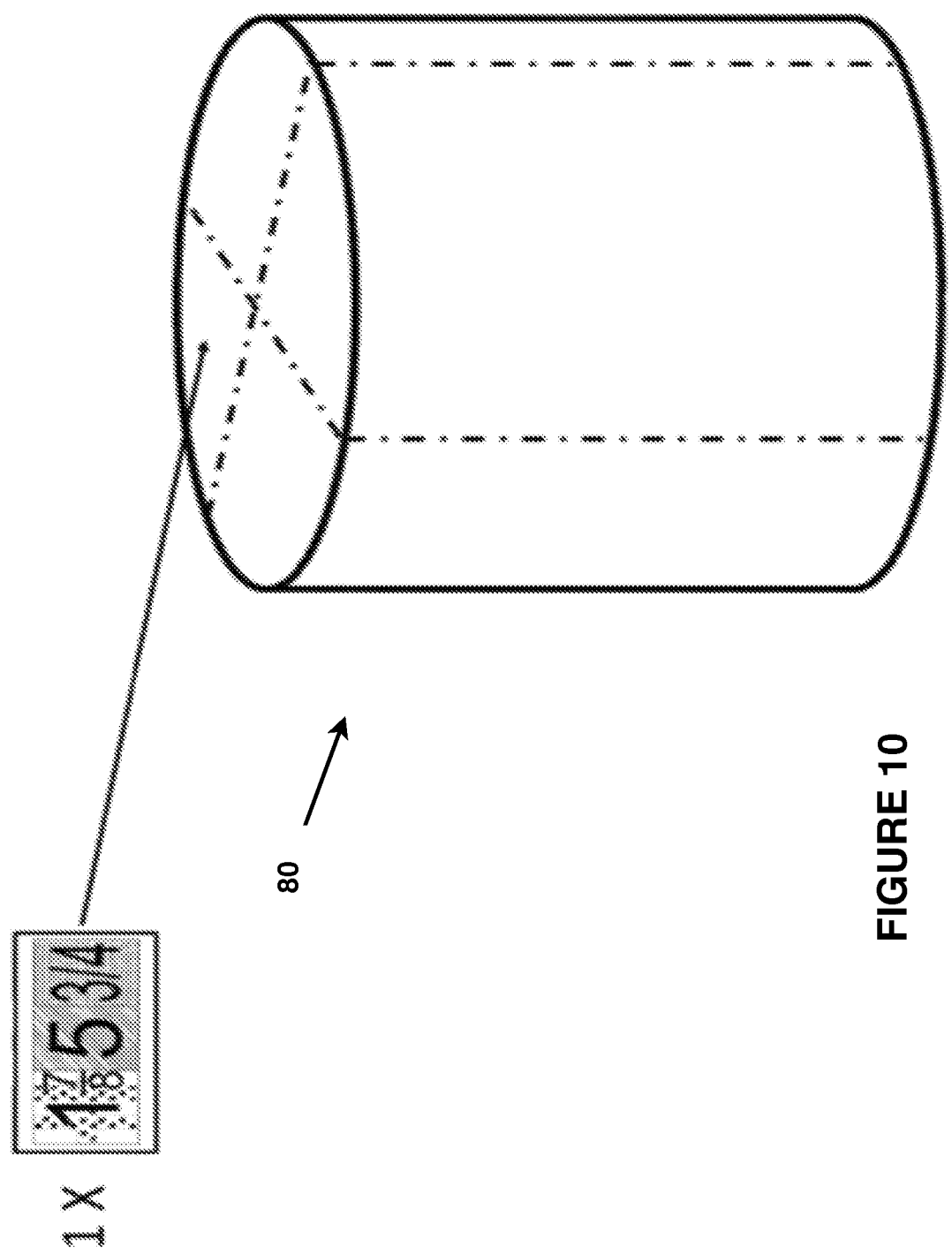
FIG. 10 illustrate a circular container wherein an identification label is used on the top of the circular container.

Referring to FIG. 9-10, an example of a circular container on which are attached identification labels on the body of the circular container at each 90 degree is illustrated on FIG. 9; an example of a circular container on which is attached an identification label on the top of the circular container is illustrated on FIG. 10.

Figure 11:
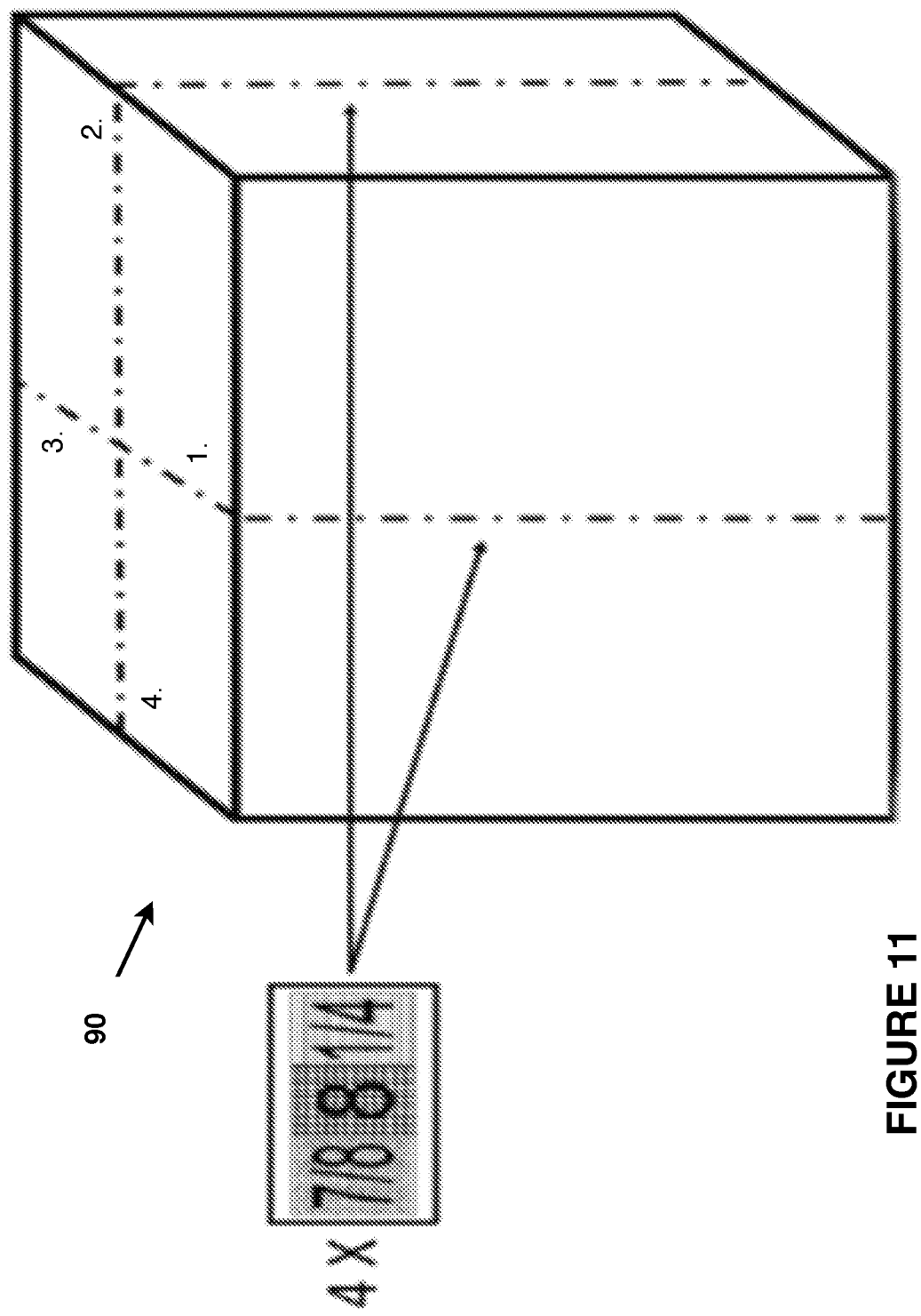
FIG. 11 illustrated a box wherein 4 identification labels are used on the 4 laterals side of the box.
Figure 12:
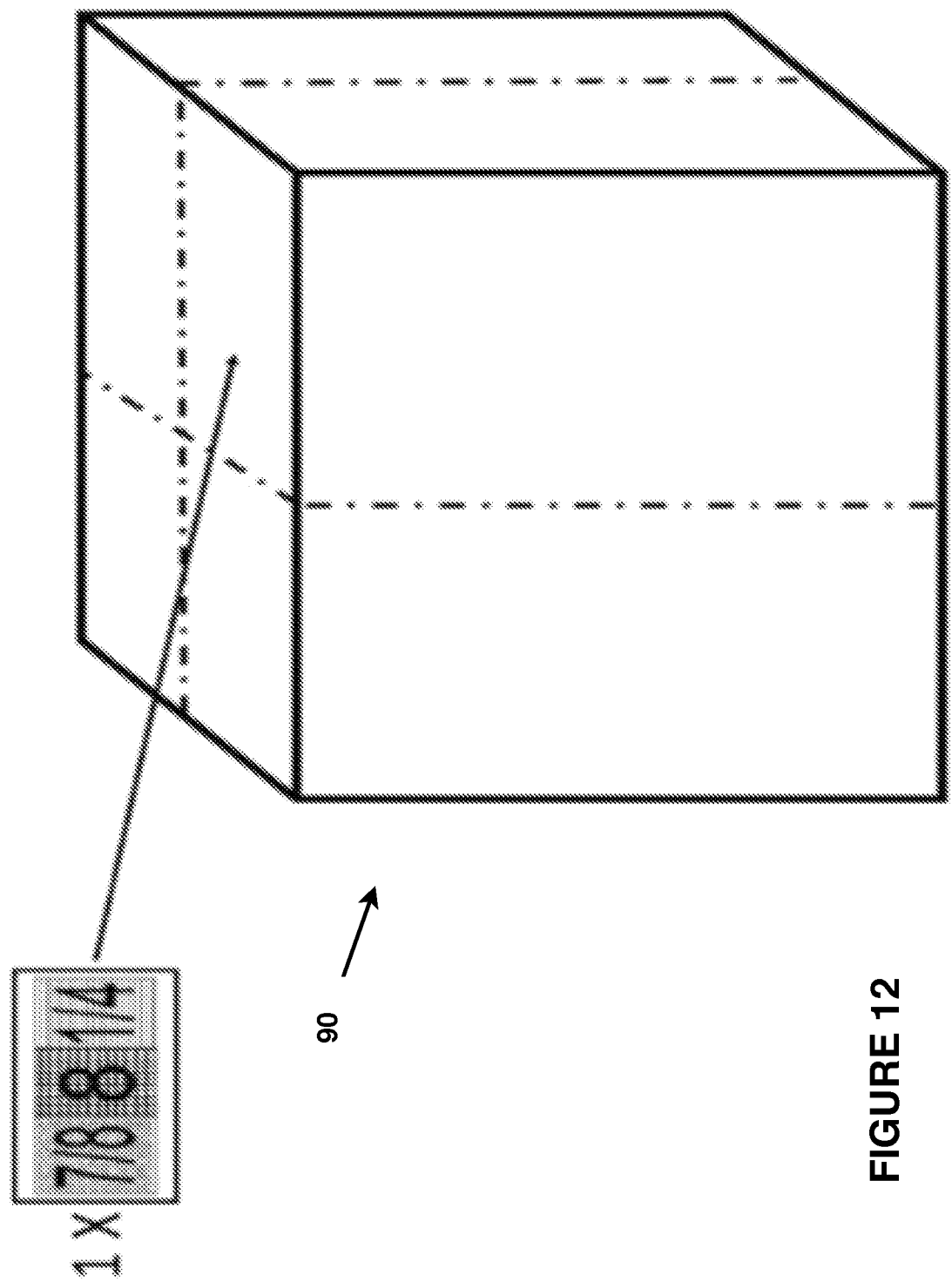
FIG. 12 illustrate a box wherein an identification label is used on the top of the box.

Referring to FIG. 11-12, an example of a box on which are attached identification labels on each lateral side of the box is illustrated on FIG. 11; an example of a box on which is attached an identification label on the top of the box is illustrated on FIG. 12.

Figure 13:
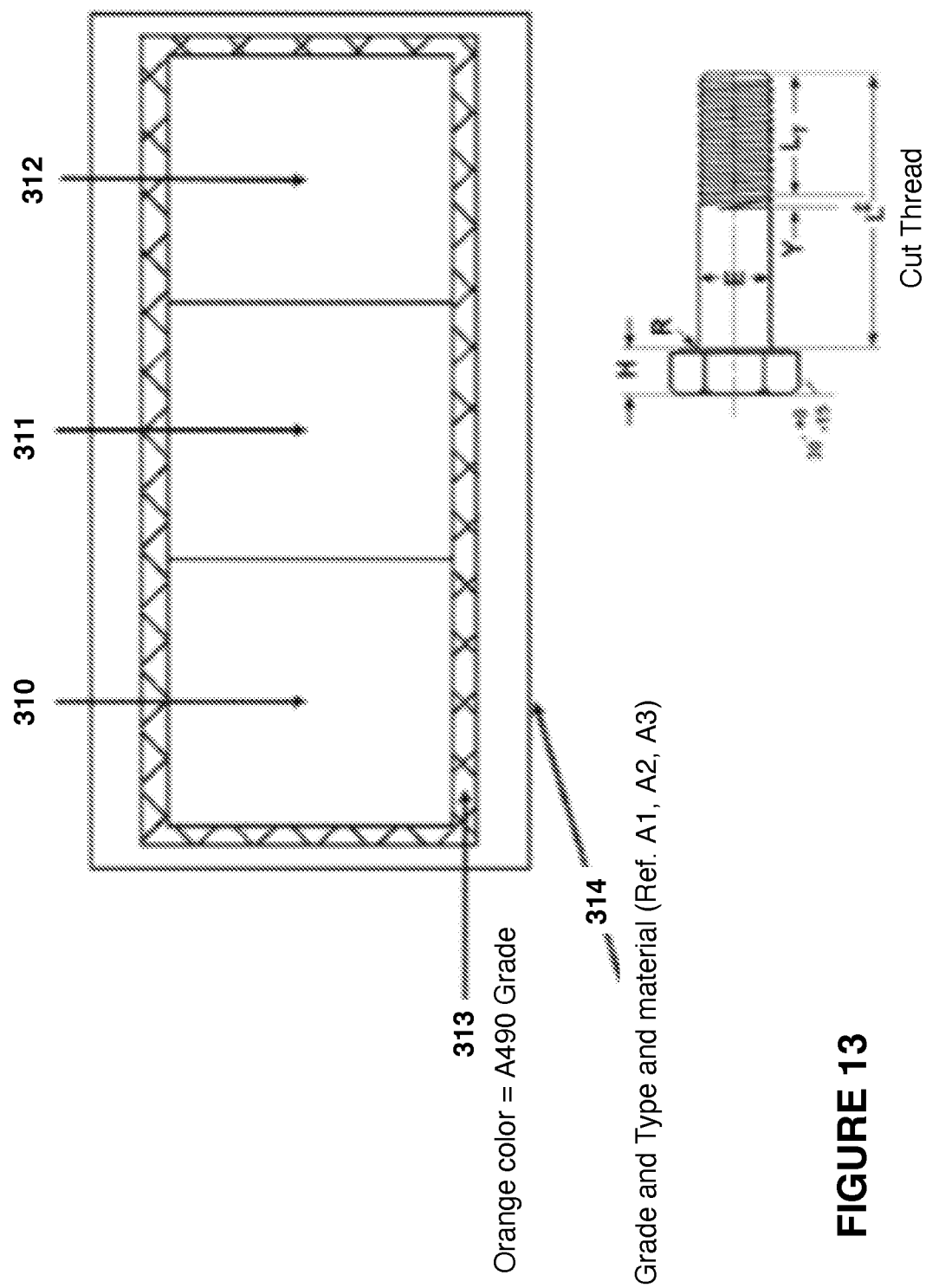
FIG. 13 illustrates an example of an identification label for a bolt with a hexagonal head in accordance with the invention.

Referring to FIG. 13, another example of an identification label used with the imperial measurement system to identify bolts having a hexagonal head is illustrated. The section 310 on the left side indicates the diameter. The central section 311 and the right section 312 are used to specify the length of the bolt. In this case, the section 310 is shaped like a square to associate the label with a bolt having a hexagonal head.

Figure 14:
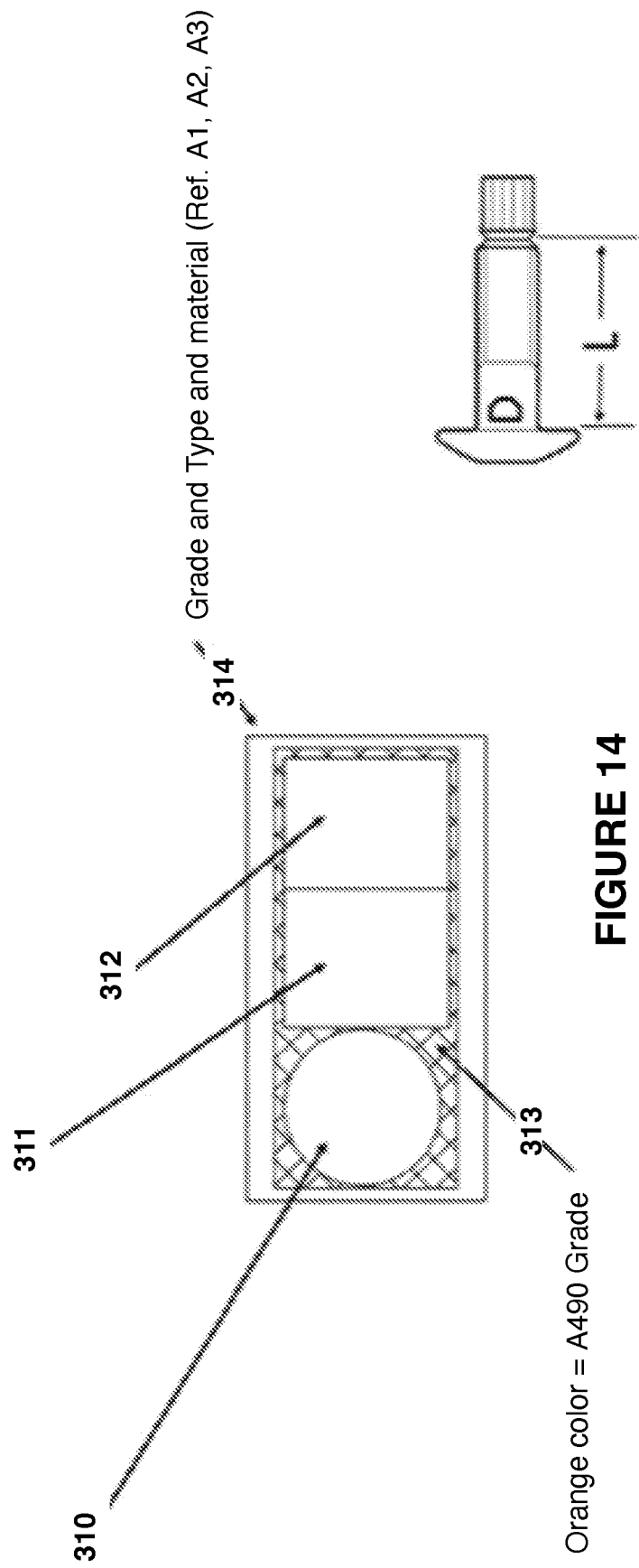
FIG. 14 illustrates an example of an identification label for a bolt with a round head in accordance with the invention.

Referring to FIG. 14, another example of an identification label used with the imperial measurement system to identify bolts having a round head is illustrated. The section 310 on the left side indicates the diameter. The central section 311 and the right section 312 are used to specify the length of the bolt. In this case, the section 310 is shaped like a circle to associate the label with a bolt having a round head.

Figure 15:
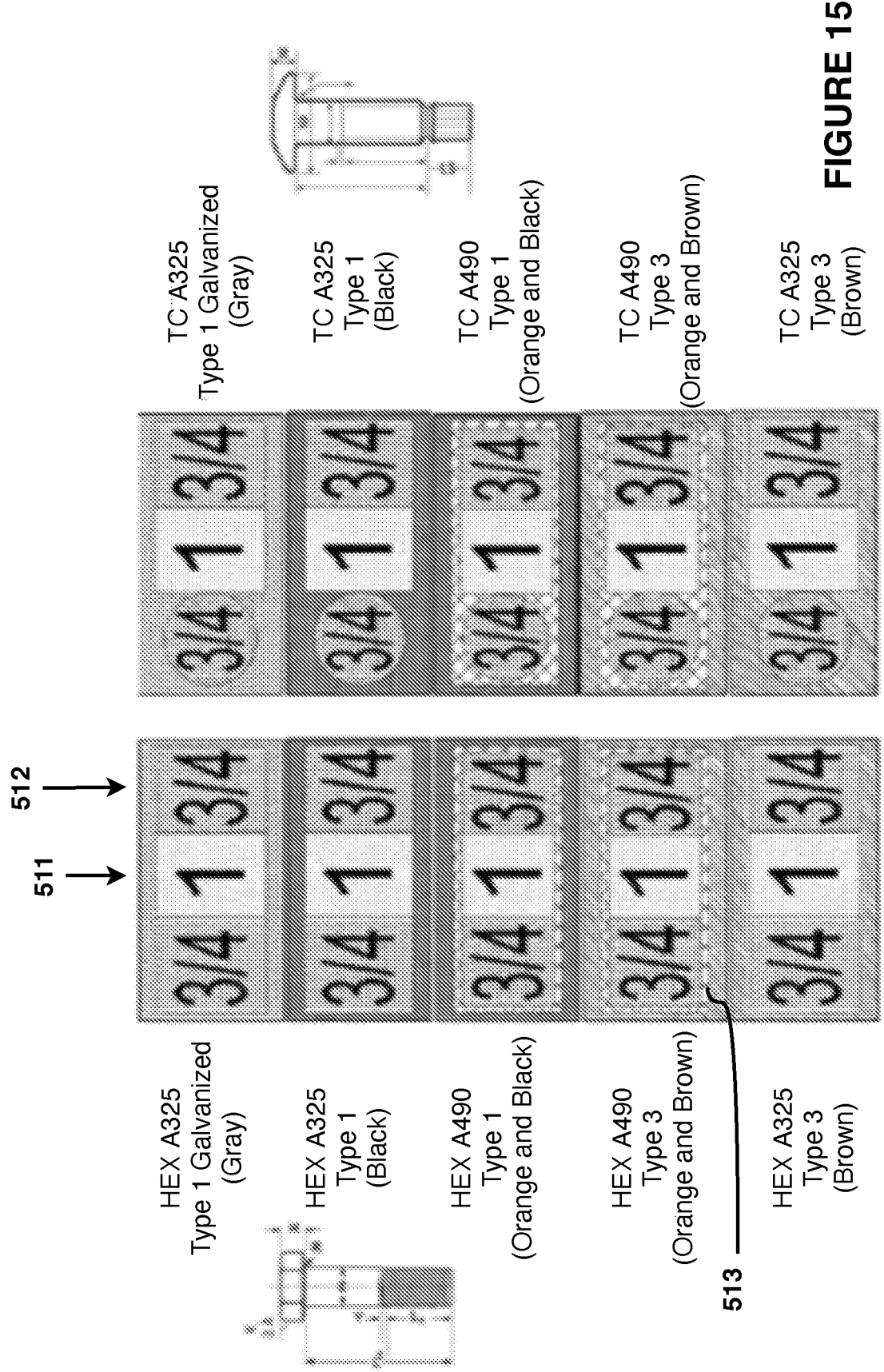
FIG. 15 illustrates examples of identification labels used to distinguish between different types of bolts.

FIG. 15 shows various examples of bolts of different types. The central portion 511 indicates the numeral 1 and the right portion 512 the fraction ¾, which together thus together indicate a length of 1¾ inch. The square shape of the left portion of FIG. 15 is used in this instance to indicate a hexagonal head while the round shape of the right portion of FIG. 15 indicates a round head.

The color of the rectangular contour can be used to indicate the type of metal the bolt is made from (i.e., a third characteristic of the hardware piece). In this example, all gray means an A325 type 1 galvanized bolt, all black means an A325 type 1 bolt, all brown means an A325 type 3 bolt, half black and half orange means an A490 type 1 bolt and half brown and half orange means an A490 type 3 bolt.

Figure 16A:
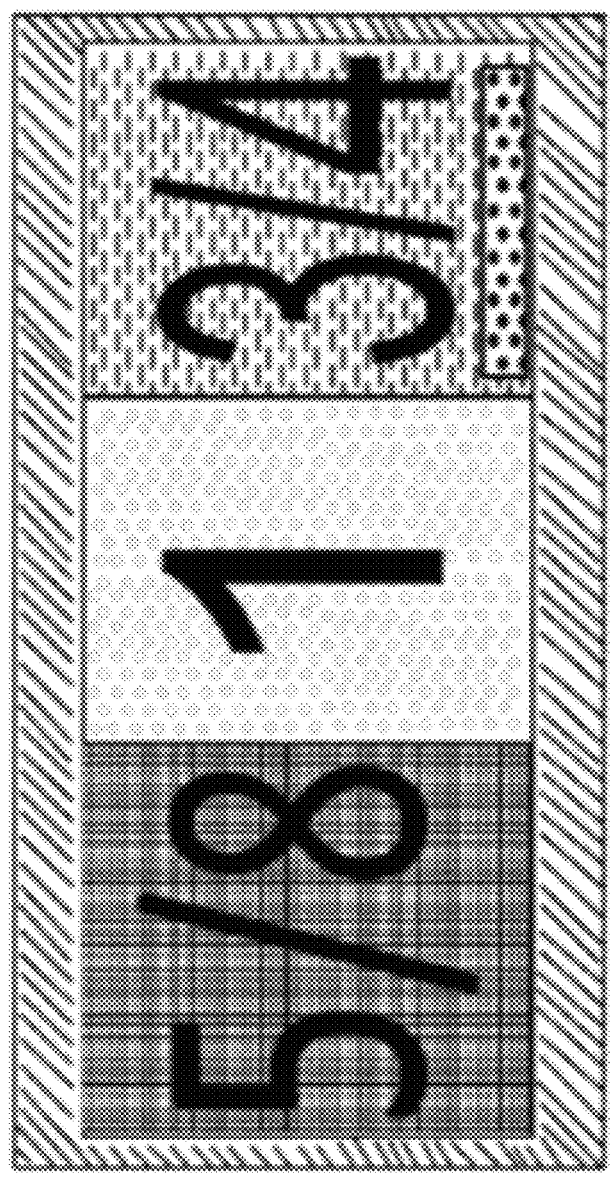
FIGS. 16A, 16B and 16C illustrate examples of identification labels used to identify the location of washers. It will be noted that throughout the appended drawings, like features are identified by like reference numerals.
Figure 16B:
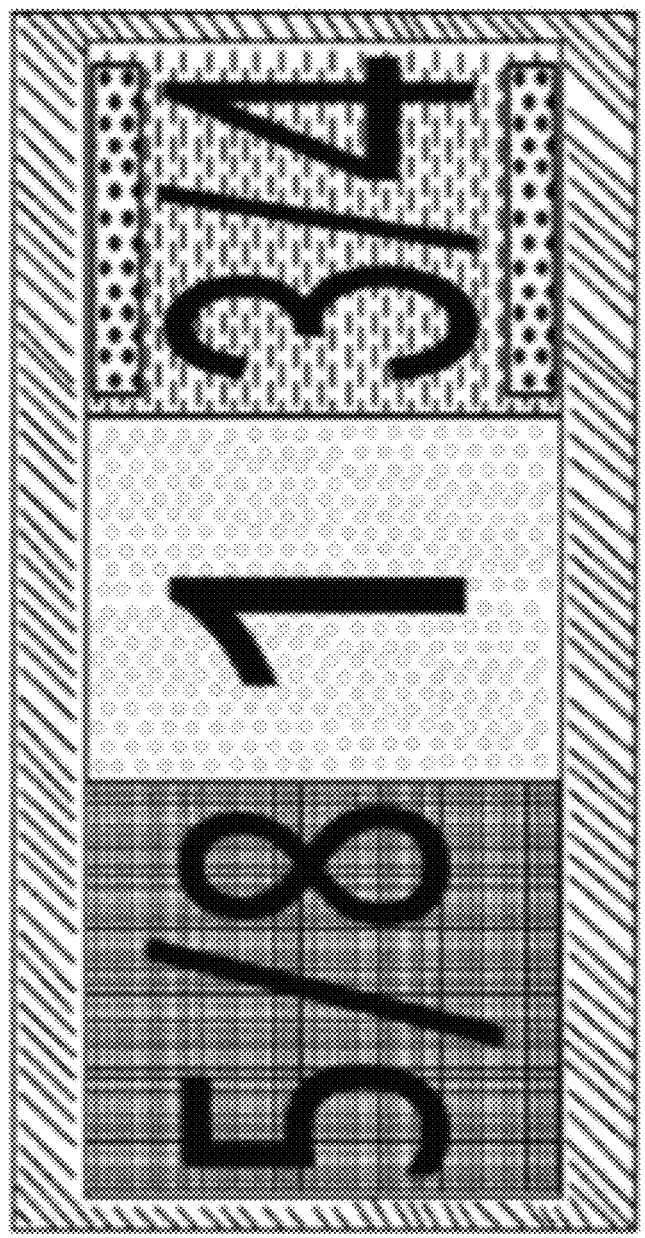
Figure 16C:
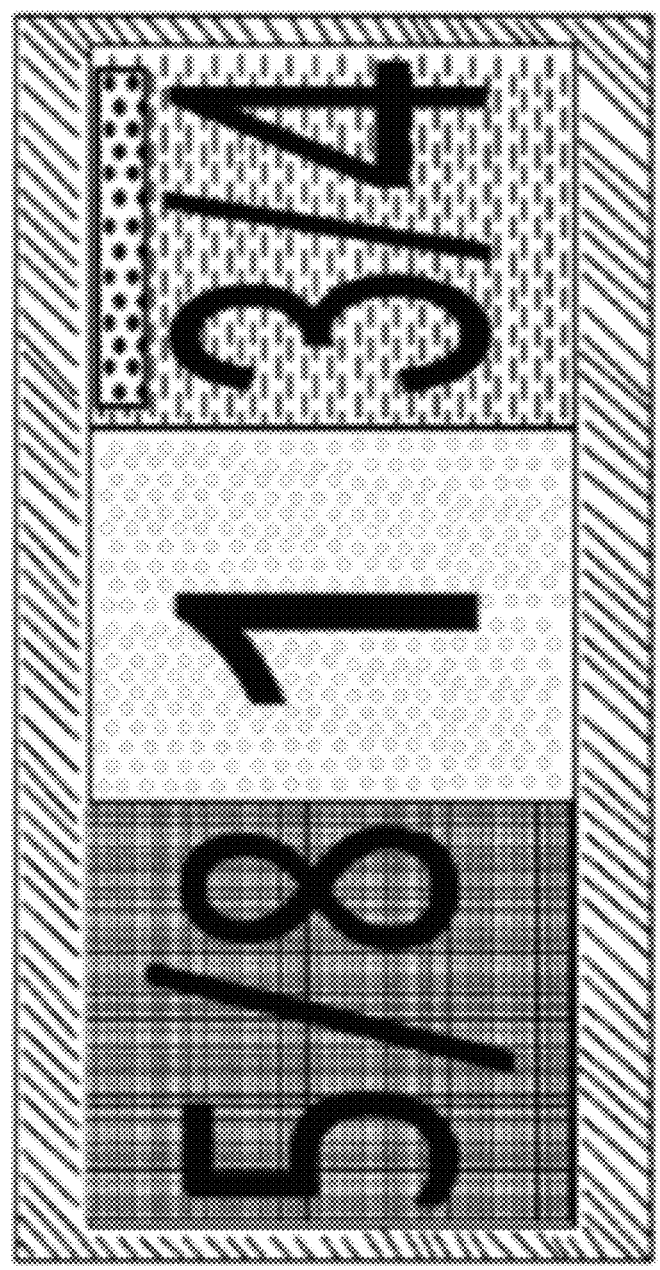

In FIGS. 16A, 16B and 16C, an additional and optional marking in the form of a rectangle over or under the numeral is added to the right portion to indicate the presence (or not) of a washer placed adjacent the free end (FIG. 16A), the head and the free end (FIG. 16B) or the head (FIG. 16B).

According to an embodiment, the at least one hardware piece is further characterized by an assembly requirement (not shown). The chart further comprises an assembly-requirement symbol associated with the assembly requirement. Also, the identification label further comprises a fifth section (not shown) identified thereon comprising the assembly-requirement symbol when the assembly requirement is present in relation with the hardware piece having the first characteristic and the second characteristic.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A system for sorting hardware pieces, wherein each one of the hardware pieces has a first characteristic and a second characteristic, the system comprising:
   a chart on which are displayed:
      a plurality of unique first graphical combinations associated with the first characteristic of a hardware piece, wherein each unique first graphical combination comprises a first-characteristic indicium overlaid on a first-characteristic background comprising at least one of color, pattern and graphical arrangement; and
      a plurality of unique second graphical combinations associated with the second characteristic of a hardware piece, wherein each unique second graphical combination comprises a second-characteristic indicium overlaid on a second-characteristic background comprising at least one of color, pattern and graphical arrangement;
   an identification label indicative of the first and second characteristics associated with the hardware piece, the identification label comprising:
      a first section comprising at least one of the unique first graphical combinations associated with the first characteristic of the hardware piece; and
      a second section comprising at least one of the unique second graphical combinations associated with the second characteristic of the hardware piece; and
   a container affixed with the identification label for containing the hardware piece which correspond to the first and second characteristics.

2. The system of claim 1, wherein at least one of the first-characteristic indicium and the second-characteristic indicium comprises one of a numerical value and a symbol.

3. The system of claim 1, wherein, in relation with all of the identification labels, the first-characteristic indicium and the second-characteristic indicium depicted on the identification label is depicted in a color absent from the background comprising at least one of color, pattern and graphical arrangement associated depicted on the identification label.

4. The system of claim 1, further comprising a structure on a worksite with an identification label attached thereto, wherein the structure comprises structural components adapted to receive a hardware piece having the characteristics associated with the identification label.

5. The system of claim 1, wherein the chart displays a plurality of unique third graphical combinations associated with the second characteristic of a hardware piece, wherein each unique third graphical combination comprises a third-characteristic indicium overlaid on a third-characteristic background comprising at least one of color, pattern and graphical arrangement, further wherein the label comprises a third section comprising at least one of the unique third graphical combinations associated with one of the first or the second characteristics of the sorted hardware piece.

6. The system of claim 1, wherein the hardware pieces have a third characteristic associated therewith corresponding to a type among a plurality of types, wherein the chart further comprises a plurality of symbols with each one of the symbols associated with a corresponding one of types; and wherein the identification label further comprises a fourth section at least partially covered with the symbol associated with the hardware piece.

7. The system of claim 1, wherein at least one hardware piece is further characterized by an assembly requirement, wherein the chart further comprises an assembly-requirement symbol associated with the assembly requirement; and wherein the identification label further comprises a fifth section identified thereon comprising the assembly-requirement symbol when the assembly requirement is present in relation with the hardware piece having the first characteristic and the second characteristic.

8. A system for sorting hardware pieces, wherein each one of the hardware pieces has a first characteristic, the system comprising:
 a chart on which are displayed a plurality of unique first graphical combinations associated with the first characteristic of a hardware piece, wherein each unique first graphical combination comprises a first-characteristic indicium overlaid on a first-characteristic background comprising at least one of color, pattern and graphical arrangement; and
 an identification label indicative of the first characteristic associated with the hardware piece, the identification label comprising a first section comprising at least one of the unique first graphical combinations associated with the first characteristic of the hardware piece.

9. The system of claim 8, wherein each one of the hardware pieces also has a second characteristic, wherein the chart further displays a plurality of unique second graphical combinations associated with the second characteristic of a hardware piece, wherein each unique second graphical combination comprises a second-characteristic indicium overlaid on a second-characteristic background comprising at least one of color, pattern and graphical arrangement, and wherein the identification label further comprises a second section comprising at least one of the unique second graphical combinations associated with the second characteristic of the hardware piece.

10. The system of claim 9, wherein at least one of the first-characteristic indicium and the second-characteristic indicium comprises one of a numerical value and a symbol.

11. The system of claim 8, wherein the hardware pieces have a third characteristic associated therewith corresponding to a type among a plurality of types, wherein the chart further comprises a plurality of symbols with each one of the symbols associated with a corresponding one of types; and wherein the identification label further comprises a fourth section at least partially covered with the symbol associated with the hardware piece.

12. The system of claim 8, wherein at least one hardware piece is further characterized by an assembly requirement, wherein the chart further comprises an assembly-requirement symbol associated with the assembly requirement; and wherein the identification label further comprises a fifth section identified thereon comprising the assembly-requirement symbol when the assembly requirement is present in relation with the hardware piece having the first characteristic and the second characteristic.

\* \* \* \* \*